(12) United States Patent
Shehab et al.

(10) Patent No.: US 11,455,563 B2
(45) Date of Patent: Sep. 27, 2022

(54) NOISE REDUCED CIRCUITS FOR TRAPPED-ION QUANTUM COMPUTERS

(71) Applicant: IONQ, INC., College Park, MD (US)

(72) Inventors: Omar Shehab, Hyattsville, MD (US); Isaac Hyun Kim, Menlo Park, CA (US)

(73) Assignee: IONQ, INC., College Park, MD (US)

( * ) Notice: Subject to any disclaimer, the term of this patent is extended or adjusted under 35 U.S.C. 154(b) by 605 days.

(21) Appl. No.: 16/578,142

(22) Filed: Sep. 20, 2019

(65) Prior Publication Data

US 2020/0372390 A1     Nov. 26, 2020

Related U.S. Application Data

(60) Provisional application No. 62/852,264, filed on May 23, 2019.

(51) Int. Cl.
*G06N 10/00* (2022.01)
*G06E 3/00* (2006.01)

(52) U.S. Cl.
CPC ............. *G06N 10/00* (2019.01); *G06E 3/005* (2013.01)

(58) Field of Classification Search
CPC ................................. G06N 10/00; G06E 3/005
See application file for complete search history.

(56) References Cited

FOREIGN PATENT DOCUMENTS

WO    WO-2019220122 A1 * 11/2019 ......... G06F 11/3409

OTHER PUBLICATIONS

Wang, Y., Um, M., Zhang, J., An, S., Lyu, M., Zhang, J. N., Duan, L. M., Yum, D., Kim, K. (2017). Single-qubit quantum memory exceeding ten-minute coherence time. Nature Photonics, 11(10), 646-650. https://doi.org/10.1038/s41566-017-0007-1.

Webb, A. E., Webster, S. C., Collingbourne, S., Bretaud, D., Lawrence, A. M., Weidt, S., Mintert, F., & Hensinger, W. K. (2018). Resilient entanglement gates for trapped ions. Physical Review Letters, 121(18), 180501. https://doi.org/10.1103/PhysRevLett.121.180501.

Wineland, D. J., Monroe, C., Itano, W. M., Leibfried, D., King, B. E., & Meekhof, D. M. (1998). Experimental Issues in Coherent Quantum-State Manipulation of Trapped Atomic Ions. Journal of Research of the National Institute of Standards and Technology, 103(3), 259. https://doi.org/10.6028/jres.103.019.

(Continued)

*Primary Examiner* — Syed I Gheyas
(74) *Attorney, Agent, or Firm* — Patterson + Sheridan LLP

(57) ABSTRACT

Embodiments described herein are generally related to a method and a system for performing a computation using a hybrid quantum-classical computing system, and, more specifically, to providing an approximate solution to an optimization problem using a hybrid quantum-classical computing system that includes a group of trapped ions. A hybrid quantum-classical computing system that is able to provide a solution to a combinatorial optimization problem may include a classical computer, a system controller, and a quantum processor. The methods and systems described herein include an efficient and noise resilient method for constructing trial states in the quantum processor in solving a problem in a hybrid quantum-classical computing system, which provides improvement over the conventional method for computation in a hybrid quantum-classical computing system.

20 Claims, 8 Drawing Sheets

(56) References Cited

OTHER PUBLICATIONS

Wright, K., Beck, K. M., Debnath, S., Amini, J. M., Nam, Y., Grzesiak, N., Chen, J. S., Pisenti, N. C., Chmielewski, M., Collins, C., Hudek, K. M., Mizrahi, J., Wong-Campos, J. D., Allen, S., Apisdorf, J., Solomon, P., Williams, M., Ducore, A. M., Blinov, A., . . . Kim, J. (2019). Benchmarking an 11-qubit quantum computer. Nature Communications, 10, 5464. https://doi.org/10.1038/s41467-019-13534-2.
Wu, Y., Wang, S. T., & Duan, L.-M. (2018). Noise analysis for high-fidelity quantum entangling gates in an anharmonic linear Paul trap. Physical Review A, 97(6), 062325. https://doi.org/10.1103/PhysRevA.97.062325.
Zhu, S.-L., Monroe, C., & Duan, L.-M. (2006). Trapped ion quantum computation with transverse phonon modes. Physical Review Letters, 97(5), 050505. https://doi.org/10.1103/PhysRevLett.97.050505.
Farhang Haddadfarshi et al. "High Fidelity Quantum Gates of Trapped Ions in the Presence of Motional Heating", New Journal of Physics, vol. 18, No. 12, Dec. 2, 2016, p. 123007, XP055722925.
International Search Report dated Sep. 4, 2020 for Application No. PCT/US2020/034008.
Alberto Peruzzo, Jarrod McClean, Peter Shadbolt, Man-Hong Yung, Xiao-Qi Zhou, Peter J Love, Alán Aspuru-Guzik, and Jeremy L O'brien. A variational eigenvalue solver on a photonic quantum processor. Nature communications, 5:4213, 2014.
Jarrod R McClean, Jonathan Romero, Ryan Babbush, and Alán Aspuru-Guzik. The theory of variational hybrid quantum-classical algorithms. New Journal of Physics, 18(2):023023, 2016.
John Preskill. Quantum computing in the nisq era and beyond. arXiv preprint arXiv:1801.00862, 2018.
A Yu Kitaev. Quantum measurements and the abelian stabilizer problem. arXiv preprint quantph/ 9511026, 1995.
Miroslav Dobšícek, Göran Johansson, Vitaly Shumeiko, and GöranWendin. Arbitrary accuracy iterative quantum phase estimation algorithm using a single ancillary qubit: A two-qubit benchmark. Physical Review A, 76(3):030306, 2007.
PJJ O'Malley, Ryan Babbush, ID Kivlichan, Jonathan Romero, JR McClean, Rami Barends, Julian Kelly, Pedram Roushan, Andrew Tranter, Nan Ding, et al. Scalable quantum simulation of molecular energies. Physical Review X, 6(3):031007, 2016.
Yangchao Shen, Xiang Zhang, Shuaining Zhang, Jing-Ning Zhang, Man-Hong Yung, and Kihwan Kim. Quantum implementation of the unitary coupled cluster for simulating molecular electronic structure. Physical Review A, 95(2):020501, 2017.
Abhinav Kandala, Antonio Mezzacapo, Kristan Temme, Maika Takita, Markus Brink, Jerry M Chow, and Jay M Gambetta. Hardware-efficient variational quantum eigensolver for small molecules and quantum magnets. Nature, 549(7671):242, 2017.
JI Colless, VV Ramasesh, D Dahlen, MS Blok, ME Kimchi-Schwartz, JR McClean, J Carter, WA De Jong, and I Siddiqi. Computation of molecular spectra on a quantum processor with an errorresilient algorithm. Physical Review X, 8(1):011021, 2018.
Raffaele Santagati, Jianwei Wang, Antonio A Gentile, Stefano Paesani, Nathan Wiebe, Jarrod R Mc-Clean, Sam Morley-Short, Peter J Shadbolt, Damien Bonneau, Joshua W Silverstone, et al. Witnessing eigenstates for quantum simulation of hamiltonian spectra. Science advances, 4(1):eaap9646, 2018.
Cornelius Hempel, Christine Maier, Jonathan Romero, Jarrod McClean, Thomas Monz, Heng Shen, Petar Jurcevic, Ben Lanyon, Peter Love, Ryan Babbush, et al. Quantum chemistry calculations on a trapped-ion quantum simulator. arXiv preprint arXiv:1803.10238, 2018.
EF Dumitrescu, AJ McCaskey, G Hagen, GR Jansen, TD Morris, T Papenbrock, RC Pooser, DJ Dean, and P Lougovski. Cloud quantum computing of an atomic nucleus. arXiv preprint arXiv:1801.03897, 2018.
N Klco, EF Dumitrescu, AJ McCaskey, TD Morris, RC Pooser, M Sanz, E Solano, P Lougovski, and MJ Savage. Quantum-classical dynamical calculations of the schwinger model using quantum computers. arXiv preprint arXiv:1803.03326, 2018.
Yunseong Nam, Jwo-Sy Chen, Neal C Pisenti, Kenneth Wright, Conor Delaney, Dmitri Maslov, Kenneth R Brown, Stewart Allen, Jason M Amini, Joel Apisdorf, et al. Ground-state energy estimation of the water molecule on a trapped on quantum computer. arXiv preprint arXiv:1902.10171, 2019.
JKL MacDonald. On the modified ritz variation method. Physical Review, 46(9):828, 1934.
DH Weinstein. Modified ritz method. Proceedings of the National Academy of Sciences, 20(9):529-532, 1934.
Sam McArdle, Suguru Endo, Alan Aspuru-Guzik, Simon Benjamin, and Xiao Yuan. Quantum computational chemistry. arXiv preprint arXiv:1808.10402, 2018.
Panagiotis KI Barkoutsos, Jerome F Gonthier, Igor Sokolov, Nikolaj Moll, Gian Salis, Andreas Fuhrer, Marc Ganzhorn, Daniel J Egger, Matthias Troyer, Antonio Mezzacapo, et al. Quantum algorithms for electronic structure calculations: particle/hole hamiltonian and optimized wavefunction expansions. arXiv preprint arXiv:1805.04340, 2018.
Jarrod R McClean, Sergio Boixo, Vadim N Smelyanskiy, Ryan Babbush, and Hartmut Neven. Barren plateaus in quantum neural network training landscapes. arXiv preprint arXiv:1803.11173, 2018.
O. Shehab, K. Landsman, Y. Nam, D. Zhu, N. M. Linke, M. Keesan, E. F. Dumitrescu, A. J. McCaskey, G.Hagen, G.R. Jansen, T.D. Morris, T. Papenbrock, R. C. Pooser, D. J. Dean, P. Lougovski, and C. Monroe. Toward convergence of effective field theory simulations on digital quantum computers. in preparation.
Nikolaj Moll, Andreas Fuhrer, Peter Staar, and Ivano Tavernelli. Optimizing qubit resources for quantum chemistry simulations in second quantization on a quantum computer. Journal of Physics A: Mathematical and Theoretical, 49 (29):295301, 2016.
Sergey Bravyi, Jay M Gambetta, Antonio Mezzacapo, and Kristan Temme. Tapering off qubits to simulate fermionic hamiltonians. arXiv preprint arXiv:1701.08213, 2017.
Stuart Hadfield and Anargyros Papageorgiou. Divide and conquer approach to quantum hamiltonian simulation. New Journal of Physics, 20(4):043003, 2018.
Jin-Guo Liu, Yi-Hong Zhang, Yuan Wan, and Lei Wang. Variational quantum eigensolver with fewer qubits, 2019.
Tyler Takeshita, Nicholas C Rubin, Zhang Jiang, Eunseok Lee, Ryan Babbush, and Jarrod R McClean. Increasing the representation accuracy of quantum simulations of chemistry without extra quantum resources. arXiv preprint arXiv:1902.10679, 2019.
Isaac H Kim and Brian Swingle. Robust entanglement renormalization on a noisy quantum computer. arXiv preprint arXiv:1711.07500, 2017.
Isaac H Kim. Noise-resilient preparation of quantum many-body ground states. arXiv preprint arXiv:1703.00032, 2017.
Glen Evenbly and Guifré Vidal. Algorithms for entanglement renormalization. Physical Review B, 79(14):144108, 2009.
Thomas H Cormen, Charles E Leiserson, Ronald L Rivest, and Clifford Stein. Introduction to algorithms. MIT press, 2009.
Edward Farhi, Jeffrey Goldstone, and Sam Gutmann. A quantum approximate optimization algorithm. arXiv preprint arXiv:1411.4028, 2014.
Suguru Endo, Simon C Benjamin, and Ying Li. Practical quantum error mitigation for near-future applications. Physical Review X, 8(3):031027, 2018.
Sam McArdle, Xiao Yuan, and Simon Benjamin. Error mitigated quantum computational chemistry. arXiv preprint arXiv:1807.02467, 2018.
Lewis F Richardson, BA J Arthur Gaunt, et al. Viii. the deferred approach to the limit. Phil. Trans. R. Soc. Lond. A, 226(636-646):299-361, 1927.
Debajyoti Bera, Stephen Fenner, Frederic Green, and Steve Homer. Universal quantum circuits. arXiv preprint arXiv:0804.2429, 2008.
Shantanu Debnath. A programmable five qubit quantum computer using trapped atomic ions. PhD thesis, 2016.
Jerry Moy Chow. Quantum information processing with superconducting qubits. Yale University, 2010.
Klaus Mølmer and Anders Sørensen. Multiparticle entanglement of hot trapped ions. Physical Review Letters, 82(9):1835, 1999.

(56) References Cited

OTHER PUBLICATIONS

Kevin A Landsman, Caroline Figgatt, Thomas Schuster, Norbert M Linke, Beni Yoshida, Norm Y Yao, and Christopher Monroe. Verified quantum information scrambling. arXiv:1806.02807, 2018.
Shantanu Debnath, Norbert M Linke, Caroline Figgatt, Kevin A Landsman, KevinWright, and Christopher Monroe. Demonstration of a small programmable quantum computer with atomic qubits. Nature, 536(7614):63, 2016.
Shi-Liang Zhu, C Monroe, and L-M Duan. Arbitrary-speed quantum gates within large ion crystals through minimum control of laser beams. EPL (Europhysics Letters), 73(4):485, 2006.
Dmitri Maslov. Basic circuit compilation techniques for an ion-trap quantum machine. New Journal of Physics, 19(2):023035, 2017.
Dmitri Maslov and Yunseong Nam. Use of global interactions in efficient quantum circuit constructions. New Journal of Physics, 20(3):033018, 2018.
Ivan Kassal, Stephen P Jordan, Peter J Love, Masoud Mohseni, and Alán Aspuru-Guzik. Polynomialtime quantum algorithm for the simulation of chemical dynamics. Proceedings of the National Academy of Sciences, pp. pnas-0808245105, 2008.
Nicholas J Ward, Ivan Kassal, and Alán Aspuru-Guzik. Preparation of many-body states for quantum simulation. The Journal of chemical physics, 130(19):194105, 2009.
Jonathan Welch, Daniel Greenbaum, Sarah Mostame, and Alan Aspuru-Guzik. Efficient quantum circuits for diagonal unitaries without ancillas. New Journal of Physics, 16(3):033040, 2014.
Dawei Lu, Nanyang Xu, Ruixue Xu, Hongwei Chen, Jiangbin Gong, Xinhua Peng, and Jiangfeng Du. Simulation of chemical isomerization reaction dynamics on a nmr quantum simulator. Physical review letters, 107(2):020501, 2011.
Borzu Toloui and Peter J Love. Quantum algorithms for quantum chemistry based on the sparsity of the ci-matrix. arXiv preprint arXiv:1312.2579, 2013.
Alán Aspuru-Guzik, Anthony D Dutoi, Peter J Love, and Martin Head-Gordon. Simulated quantum computation of molecular energies. Science, 309(5741):1704-1707, 2005.
N Cody Jones, James D Whitfield, Peter L McMahon, Man-Hong Yung, Rodney Van Meter, Alán Aspuru-Guzik, and Yoshihisa Yamamoto. Faster quantum chemistry simulation on fault-tolerant quantum computers. New Journal of Physics, 14(11):115023, 2012.
James D Whitfield, Jacob Biamonte, and Alán Aspuru-Guzik. Simulation of electronic structure hamiltonians using quantum computers. Molecular Physics, 109(5):735-750, 2011.
Dave Wecker, Bela Bauer, Bryan K Clark, Matthew B Hastings, and Matthias Troyer. Gate-count estimates for performing quantum chemistry on small quantum computers. Physical Review A, 90(2):022305, 2014.
Pascual Jordan and Eugene Paul Wigner. über das paulische äquivalenzverbot. In the Collected Works of Eugene Paul Wigner, pp. 109-129. Springer, 1993.
Jacob T Seeley, Martin J Richard, and Peter J Love. The bravyi-kitaev transformation for quantum computation of electronic structure. The Journal of chemical physics, 137(22):224109, 2012.
Sergey B Bravyi and Alexei Yu Kitaev. Fermionic quantum computation. Annals of Physics, 298(1):210-226, 2002.
Andrew Tranter, Sarah Sofia, Jake Seeley, Michael Kaicher, Jarrod McClean, Ryan Babbush, Peter V Coveney, Florian Mintert, Frank Wilhelm, and Peter J Love. The b ravyi-k itaev transformation: Properties and applications. International Journal of Quantum Chemistry, 115(19):1431-1441, 2015.
Oscar Higgott, Daochen Wang, and Stephen Brierley. Variational quantum computation of excited states. arXiv preprint arXiv:1805.08138, 2018.
Suguru Endo, Tyson Jones, Sam McArdle, Xiao Yuan, and Simon Benjamin. Discovering hamiltonian spectra with variational quantum imaginary time simulation. arXiv preprint arXiv:1806.05707, 2018.

Jarrod R McClean, Mollie E Kimchi-Schwartz, Jonathan Carter, and Wibe A de Jong. Hybrid quantumclassical hierarchy for mitigation of decoherence and determination of excited states. Physical Review A, 95(4):042308, 2017.
International Search Report dated May 28, 2020 for Application No. PCT/US2020/015235.
International Search Report dated May 28, 2020 for Application No. PCT/US2020/015234.
Aloul, F. A., Ramani, A., Markov, I. L., Sakallah, K. A. (2002). Solving Difficult SAT Instances in the Presence of Symmetry. Proceedings of the 39th Annual Design Automation Conference, 731-736. https://doi.org/10.1145/513918.514102.
Babbush, R., Gidney, C., Berry, D. W., Wiebe, N., McClean, J., Paler, A., Fowler, A., Neven, H. (2018). Encoding Electronic Spectra in Quantum Circuits with Linear T Complexity. Physical Review X, 8(4), 041015. https://doi.org/10.1103/PhysRevX.8.041015.
Ballance, C. J., Harty, T. P., Linke, N. M., Sepiol, M. A., Lucas, D. M. (2016). High-Fidelity Quantum Logic Gates Using Trapped-Ion Hyperfine Qubits. Physical Review Letters, 117(6), 060504. https://doi.org/10.1103/PhysRevLett.117.060504.
Beauregard, S. (2003). Circuit for Shors algorithm using 2n+3 qubits. Quantum Information and Computation, 3(2), 175-185. https://doi.org/https://dl.acm.org/doi/10.5555/2011517.2011525.
Benedetti, M., Garcia-Pintos, D., Perdomo, O., Leyton-Ortega, V., Nam, Y., Perdomo-Ortiz, A. (2019). A generative modeling approach for benchmarking and training shallow quantum circuits. Npj Quantum Information, 5, 45. https://doi.org/10.1038/s41534-019-0157-8.
Bernstein, E., Vazirani, U., Comput, S. J. (1997). Quantum Complexity Theory. SIAM Journal on Computing, 26(5), 1411-1473. https://doi.org/10.1137/S0097539796300921.
Blumel, R., Grzesiak, N., Nam, Y. (2019). Power-optimal, stabilized entangling gate between trapped-ion qubits. ArXiV:1905.09292 [Quant-Ph].
Boyd, S. P., Vandenberghe, L. (2004). Convex optimization. Cambridge University Press.
Bravyi, S., Haah, J. (2012). Magic-state distillation with low overhead. Physical Review A, 86(5), 052329. https://doi.org/10.1103/PhysRevA.86.052329.
Calderon-Vargas, F. A., Barron, G. S., Deng, X.-H., Sigillito, A. J., Barnes, E., Economou, S. E. (2019). Fast high-fidelity entangling gates for spin qubits in Si double quantum dots. Physical Review B, 100(3), 035304. https://doi.org/10.1103/PhysRevB.100.035304.
Childs, A. M., Maslov, D., Nam, Y., Ross, N. J., Su, Y. (2018). Toward the first quantum simulation with quantum speedup. Proceedings of the National Academy of Sciences of the United States of America, 115(38), 9456-9461. https://doi.org/10.1073/pnas.1801723115.
Choi, T., Debnath, S., Manning, T. A., Figgatt, C., Gong, Z. X., Duan, L. M., Monroe, C. (2014). Optimal quantum control of multimode couplings between trapped ion qubits for scalable entanglement. Physical Review Letters, 112(19), 190502. https://doi.org/10.1103/PhysRevLett.112.190502.
Crooks, G. E. (2018). Performance of the Quantum Approximate Optimization Algorithm on the Maximum Cut Problem. ArXiv:1811.08419 [Quant-Ph].
Draper, T. G., Kutin, S. A., Rains, E. M., Svore, K. M. (2006). A Logarithmic-Depth Quantum Carry-Lookahead Adder. Quantum Information Computation, 6(4), 351-369. https://doi.org/10.5555/2012086.2012090.
Feynman, R. P. (1982). Simulating Physics with Computers. In International Journal of Theoretical Physics (vol. 21, Issue 6). https://doi.org/10.1007/BF02650179.
Figgatt, C., Ostrander, A., Linke, N. M., Landsman, K. A., Zhu, D., Maslov, D., Monroe, C. (2019). Parallel Entangling Operations on a Universal Ion Trap Quantum Computer. Nature, 572, 368-372. https://doi.org/10.1038/s41586-019-1427-5.
Figgatt, C. M. (2018). Building and Programming a Universal Ion Trap Quantum Computer. University of Maryland.
Gaebler, J. P., Tan, T. R., Lin, Y., Wan, Y., Bowler, R., Keith, A. C., Glancy, S., Coakley, K., Knill, E., Leibfried, D., Wineland, D. J.

(56) References Cited

OTHER PUBLICATIONS (2016). High-Fidelity Universal Gate Set for Be 9 + Ion Qubits. Physical Review Letters, 117(6), 060505. https://doi.org/10.1103/PhysRevLett.117.060505.

Gambetta, J. M., Motzoi, F., Merkel, S. T., Wilhelm, F. K. (2011). Analytic control methods for high-fidelity unitary operations in a weakly nonlinear oscillator. Physical Review A, 83(1), 012308. https://doi.org/10.1103/PhysRevA.83.012308.

Gene M. Amdahl. (1967). Validity of the single processor approach to achieving large scale computing capabilities. AFIPS Spring Joint Computer Conference.

Goemans, E. X., Williamson, D. P., Williamson, D. P., Goemans, M. X. (1994). Improved Approximation Algorithms for Maximum Cut and Satisfiability Problems Using Semidefinite Programming. Journal of the Association for Computing Machinery, 42(6), 1115-1145. https://doi.org/10.1145/227683.227684.

Green, T. J., Biercuk, M. J. (2015). Phase-modulated decoupling and error suppression in qubit-oscillator systems. Physical Review Letters, 114(12), 120502. https://doi.org/10.1103/PhysRevLett.114.120502.

Grover, L. K. (1997). Quantum Mechanics Helps in Searching for a Needle in a Haystack. Physical Review Letters, 79(2), 325. https://doi.org/https://doi.org/10.1103/PhysRevLett.79.325.

Grzesiak, N., Blumel, R., Wright, K., Beck, K. M., Pisenti, N. C., Li, M., Chaplin, V., Amini, J. M., Debnath, S., Chen, J. S., Nam, Y. (2020). Efficient arbitrary simultaneously entangling gates on a trapped-ion quantum computer. Nature Communications, 11, 2963. https://doi.org/10.1038/s41467-020-16790-9.

Harrow, A. W., Hassidim, A., Lloyd, S. (2009). Quantum algorithm for linear systems of equations. Physical Review Letters, 103(15), 150502. https://doi.org/10.1103/PhysRevLett.103.150502.

Harty, T. P., Allcock, D. T. C., Ballance, C. J., Guidoni, L., Janacek, H. A., Linke, N. M., Stacey, D. N., Lucas, D. M. (2014). High-fidelity preparation, gates, memory, and readout of a trapped-ion quantum bit. Physical Review Letters, 113(22), 220501. https://doi.org/10.1103/PhysRevLett.113.220501.

Hewitt, E., Hewitt, R. E. (1979). The Gibbs-Wilbraham Phenomenon: An Episode in Fourier Analysis. Archive for History of Exact Sciences, 21, 129-160. https://doi.org/10.1007/BF00330404.

Lin, G.-D., Zhu, S.-L., Islam, R., Kim, K., Chang, M.-S., Korenblit, S., Monroe, C., & Duan, L.-M. (2009). Large-scale quantum computation in an anharmonic linear ion trap. Europhysics Letters, 86(6), 60004. https://doi.org/10.1209/0295-5075/86/60004.

Linke, N. M., Maslov, D., Roetteler, M., Debnath, S., Figgatt, C., Landsman, K. A., Wright, K., & Monroe, C. (2017). Experimental comparison of two quantum computing architectures. Proceedings of the National Academy of Sciences of the United States of America, 114(13), 3305-3310. https://doi.org/10.1073/pnas.1618020114.

Lloyd, S., Mohseni, M., & Rebentrost, P. (2014). Quantum principal component analysis. Nature Physics, 10(9), 631-633. https://doi.org/10.1038/NPHYS3029.

Lu, Y., Zhang, S., Zhang, K., Chen, W., Shen, Y., Zhang, J., Zhang, J.-N., & Kim, K. (2019). Scalable global entangling gates on arbitrary ion qubits. Nature, 572, 363-367. https://doi.org/10.1038/s41586-019-1428-4.

Marquet, C., Schmidt-Kaler, F., & James, D. F. V. (2003). Phonon-phonon interactions due to non-linear effects in a linear ion trap. Applied Physics B, 76(3), 199-208. https://doi.org/10.1007/s00340-003-1097-7.

Maslov, D. (2016). Advantages of using relative-phase Toffoli gates with an application to multiple control Toffoli optimization. Physical Review A, 93(2), 022311. https://doi.org/10.1103/PhysRevA.93.022311.

Maslov, D., Nam, Y., & Kim, J. (2019). An Outlook for Quantum Computing [Point of View]. Proceedings of the IEEE, 107(1), 5-10. https://doi.org/10.1109/JPROC.2018.2884353.

Merrill, J. T., & Brown, K. R. (2014). Progress in compensating pulse sequences for quantum computation. In Sabre Kais (Ed.), Quantum Information and Computation for Chemistry (pp. 241-294). John Wiley & Sons. https://doi.org/10.1002/9781118742631.ch10.

Müller, M. M., Haakh, H. R., Calarco, T., Koch, C. P., & Henkel, C. (2011). Prospects for fast Rydberg gates on an atom chip. Quantum Information Processing, 10(6), 771-792. https://doi.org/10.1007/s11128-011-0296-0.

Nam, Y., & Maslov, D. (2019). Low-cost quantum circuits for classically intractable instances of the Hamiltonian dynamics simulation problem. Npj Quantum Information, 5, 44. https://doi.org/10.1038/s41534-019-0152-0.

Nam, Y., Su, Y., & Maslov, D. (2020). Approximate quantum Fourier transform with O(n log(n)) T gates. Npj Quantum Information, 6, 26. https://doi.org/10.1038/s41534-020-0257-5.

Nielsen, M. A., & Chuang, I. L. (2010). Quantum computation and quantum information. Cambridge University Press. https://doi.org/10.1017/CBO9780511976667.

O'Gorman, J., & Campbell, E. T. (2017). Quantum computation with realistic magic-state factories. Physical Review A, 95(3), 032338. https://doi.org/10.1103/PhysRevA.95.032338.

Orus, R., Mugel, S., & Lizaso, E. (2019). Quantum computing for finance: overview and prospects. Reviews in Physics, 4, 100028. https://doi.org/10.1016/j.revip.2019.100028.

Reiher, M., Wiebe, N., Svore, K. M., Wecker, D., & Troyer, M. (2017). Elucidating reaction mechanisms on quantum computers. Proceedings of the National Academy of Sciences of the United States of America, 114(29), 7555-7560. https://doi.org/10.1073/pnas.1619152114.

Shende, V. V., Markov, I. L., & Bullock, S. S. (2004). Minimal universal two-qubit controlled-NOT-based circuits. Physical Review A, 69(6), 062321. https://doi.org/10.1103/PhysRevA.69.062321.

Shor, P. W. (1999). Polynomial-Time Algorithms for Prime Factorization and Discrete Logarithms on a. SIAM Review, 41(2), 303-332.

Sørensen, A., & Mølmer, K. (1999). Quantum Computation with Ions in Thermal Motion. Physical Review Letters, 82(9), 1971. https://doi.org/10.1103/PhysRevLett.82.1971.

Spörl, A., Schulte-Herbrüggen, T., Glaser, S. J., Bergholm, V., Storcz, M. J., Ferber, J., & Wilhelm, F. K. (2007). Optimal control of coupled Josephson qubits. Physical Review A, 75(1), 012302. https://doi.org/10.1103/PhysRevA.75.012302.

Theis, L. S., Motzoi, F., Wilhelm, F. K., & Saffman, M. (2016). High-fidelity Rydberg-blockade entangling gate using shaped, analytic pulses. Physical Review A, 94(3), 032306. https://doi.org/10.1103/PhysRevA.94.032306.

Van Dam, W., Hallgren, S., & Ip, L. (2006). Quantum algorithms for some hidden shift problems. SIAM Journal on Computing, 36(3), 763-778. https://doi.org/10.1137/S009753970343141X.

* cited by examiner

NOISE REDUCED CIRCUITS FOR TRAPPED-ION QUANTUM COMPUTERS

CROSS-REFERENCE TO RELATED APPLICATIONS

This application claims the benefit to U.S. Provisional Application No. 62/852,264, filed May 23, 2019, which is incorporated by reference herein.

BACKGROUND

Field

The present disclosure generally relates to a method of performing computation in a hybrid quantum-classical computing system, and more specifically, to a method of solving an optimization problem in a hybrid computing system that includes a classical computer and quantum computer that includes a group of trapped ions.

Description of the Related Art

In quantum computing, quantum bits or qubits, which are analogous to bits representing a "0" and a "1" in a classical (digital) computer, are required to be prepared, manipulated, and measured (read-out) with near perfect control during a computation process. Imperfect control of the qubits leads to errors that can accumulate over the computation process, limiting the size of a quantum computer that can perform reliable computations.

Among physical systems upon which it is proposed to build large-scale quantum computers, is a group of ions (e.g., charged atoms), which are trapped and suspended in vacuum by electromagnetic fields. The ions have internal hyperfine states which are separated by frequencies in the several GHz range and can be used as the computational states of a qubit (referred to as "qubit states"). These hyperfine states can be controlled using radiation provided from a laser, or sometimes referred to herein as the interaction with laser beams. The ions can be cooled to near their motional ground states using such laser interactions. The ions can also be optically pumped to one of the two hyperfine states with high accuracy (preparation of qubits), manipulated between the two hyperfine states (single-qubit gate operations) by laser beams, and their internal hyperfine states detected by fluorescence upon application of a resonant laser beam (read-out of qubits). A pair of ions can be controllably entangled (two-qubit gate operations) by qubit-state dependent force using laser pulses that couple the ions to the collective motional modes of a group of trapped ions, which arise from their Coulombic interaction between the ions. In general, entanglement occurs when pairs or groups of ions (or particles) are generated, interact, or share spatial proximity in ways such that the quantum state of each ion cannot be described independently of the quantum state of the others, even when the ions are separated by a large distance.

In current state-of-the-art quantum computers, control of qubits is imperfect (noisy) and the number of qubits used in these quantum computers generally range from a hundred qubits to thousands of qubits. The number of quantum gates that can be used in such a quantum computer (referred to as a "noisy intermediate-scale quantum device" or "NISQ device") to construct circuits to run an algorithm within a controlled error rate is limited due to the noise.

For solving some optimization problems, a NISQ device having shallow circuits (with small number of gate operations to be executed in time-sequence) can be used in combination with a classical computer (referred to as a hybrid quantum-classical computing system). In particular, finding low-energy states of a many-particle quantum system, such as large molecules, or in finding an approximate solution to combinatorial optimization problems, a quantum subroutine, which is run on a NISQ device, can be run as part of a classical optimization routine, which is run on a classical computer. The classical computer (also referred to as a "classical optimizer") instructs a controller to prepare the NISQ device (also referred to as a "quantum processor") in an N-qubit state, execute quantum gate operations, and measure an outcome of the quantum processor. Subsequently, the classical optimizer instructs the controller to prepare the quantum processor in a slightly different N-qubit state, and repeats execution of the gate operation and measurement of the outcome. This cycle is repeated until the approximate solution can be extracted. Such hybrid quantum-classical computing system having an NISQ device may outperform classical computers in finding low-energy states of a many-particle quantum system and in finding approximate solutions to such combinatorial optimization problems. However, the number of quantum gate operations required within the quantum routine increases rapidly as the problem size increases, leading to accumulated errors in the NISQ device and causing the outcomes of these processes to be not reliable.

Therefore, there is a need for a procedure to construct shallow circuits that require a minimum number of quantum gate operations to perform computation and thus reduce noise in a hybrid quantum-classical computing system.

SUMMARY

A method of performing computation in a hybrid quantum-classical computing system includes computing, by a classical computer, a model Hamiltonian including a plurality of sub-Hamiltonian onto which a selected problem is mapped, setting a quantum processor in an initial state, where the quantum processor comprises a plurality of trapped ions, each of which has two frequency-separated states defining a qubit, transforming the quantum processor from the initial state to a trial state based on each of the plurality of sub-Hamiltonians and an initial set of variational parameters by applying a reduced trial state preparation circuit to the quantum processor, measuring an expectation value of each of the plurality of sub-Hamiltonians on the quantum processor, and determining, by the classical computer, if a difference between the measured expectation value of the model Hamiltonian is more or less than a predetermined value. If it is determined that the difference is more than the predetermined value, the classical computer either selects another set of variational parameters based on a classical optimization method, sets the quantum processor in the initial state, transforms the quantum processor from the initial state to a new trial state based on each of the plurality of sub-Hamiltonians and the another set of variational parameters by applying a new reduced trial state preparation circuit to the quantum processor, and measures an expectation value of the each of the plurality of sub-Hamiltonians on the quantum processor after transforming the quantum processor to the new trial state. If it is determined that the difference is less than the predetermined value, the classical computer outputs the measured expectation value of the model Hamiltonian as an optimized solution to the selected problem.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
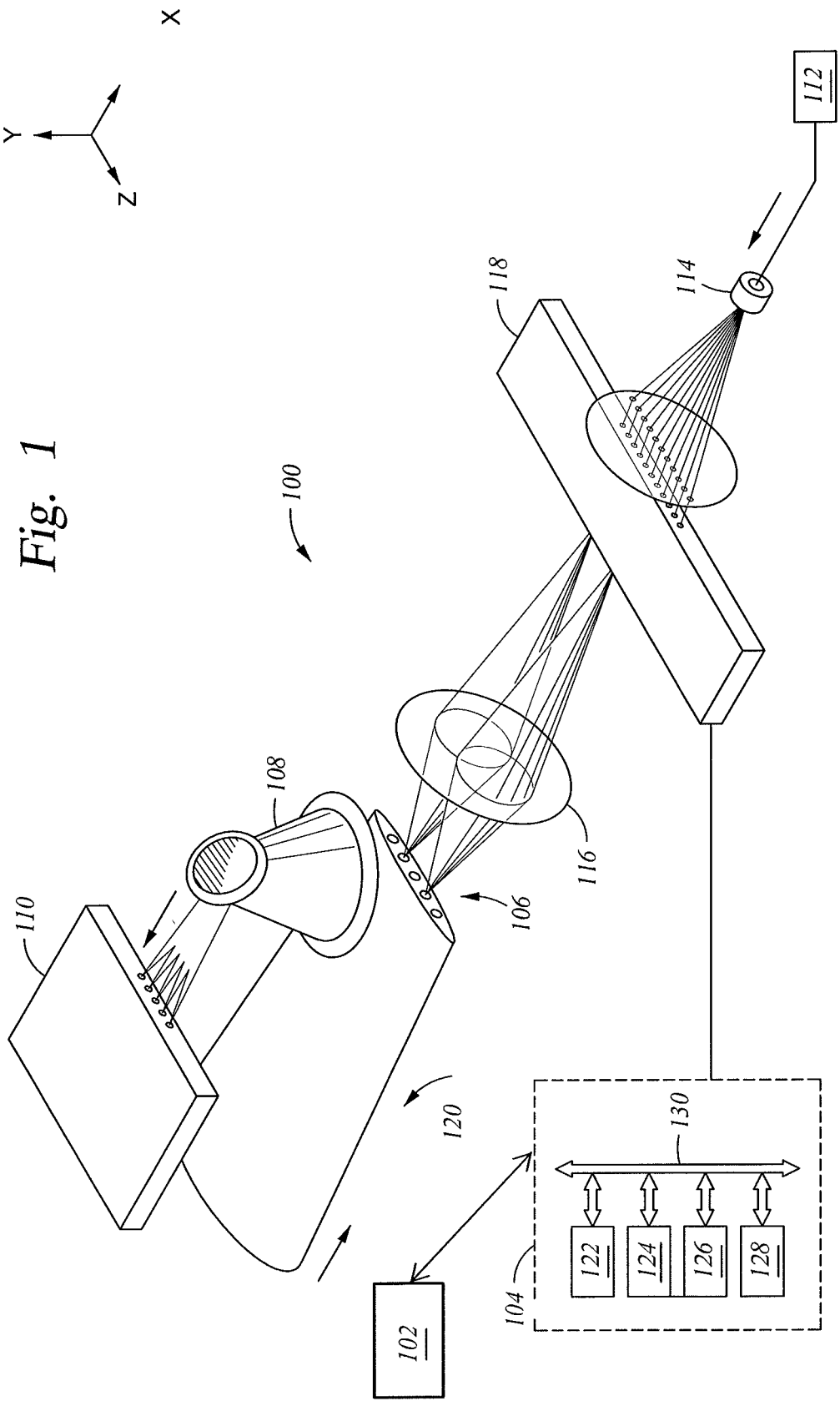
FIG. 1 is a schematic partial view of an ion trap quantum computing system according to one embodiment.

To facilitate understanding, identical reference numerals have been used, where possible, to designate identical elements that are common to the figures. In the figures and the following description, an orthogonal coordinate system including an X-axis, a Y-axis, and a Z-axis is used. The directions represented by the arrows in the drawing are assumed to be positive directions for convenience. It is contemplated that elements disclosed in some embodiments may be beneficially utilized on other implementations without specific recitation.

DETAILED DESCRIPTION

Embodiments described herein are generally related to a method and a system for performing a computation using a hybrid quantum-classical computing system, and, more specifically, to providing an approximate solution to an optimization problem using a hybrid quantum-classical computing system that includes a group of trapped ions.

A hybrid quantum-classical computing system that is able to provide a solution to a combinatorial optimization problem may include a classical computer, a system controller, and a quantum processor. In some embodiments, the system controller is housed within the classical computer. The classical computer performs supporting and system control tasks including selecting a combinatorial optimization problem to be run by use of a user interface, running a classical optimization routine, translating the series of logic gates into laser pulses to apply on the quantum processor, and pre-calculating parameters that optimize the laser pulses by use of a central processing unit (CPU). A software program for performing the tasks is stored in a non-volatile memory within the classical computer.

The quantum processor includes trapped ions that are coupled with various hardware, including lasers to manipulate internal hyperfine states (qubit states) of the trapped ions and an acousto-optic modulator to read-out the internal hyperfine states (qubit states) of the trapped ions. The system controller receives from the classical computer instructions for controlling the quantum processor, controls various hardware associated with controlling any and all aspects used to run the instructions for controlling the quantum processor, and returns a read-out of the quantum processor and thus output of results of the computation(s) to the classical computer.

The methods and systems described herein include an efficient method for constructing quantum gate operations executed by the quantum processor in solving a problem in a hybrid quantum-classical computing system.

General Hardware Configurations

FIG. 1 is a schematic partial view of an ion trap quantum computing system, or system 100, according to one embodiment. The system 100 includes a classical (digital) computer 102, a system controller 104 and a quantum processor that is a group 106 of trapped ions (i.e., five shown) that extend along the Z-axis. The classical computer 102 includes a central processing unit (CPU), memory, and support circuits (or I/O). The memory is connected to the CPU, and may be one or more of a readily available memory, such as a read-only memory (ROM), a random access memory (RAM), floppy disk, hard disk, or any other form of digital storage, local or remote. Software instructions, algorithms and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like.

An imaging objective 108, such as an objective lens with a numerical aperture (NA), for example, of 0.37, collects fluorescence along the Y-axis from the ions and maps each ion onto a multi-channel photo-multiplier tube (PMT) 110 for measurement of individual ions. Non-copropagating Raman laser beams from a laser 112, which are provided along the X-axis, perform operations on the ions. A diffractive beam splitter 114 creates an array of static Raman beams 116 that are individually switched using a multi-channel acousto-optic modulator (AOM) 118 and is configured to selectively act on individual ions. A global Raman laser beam 120 illuminates all ions at once. The system controller (also referred to as a "RF controller") 104 controls the AOM 118 and thus controls laser pulses to be applied to trapped ions in the group 106 of trapped ions. The system controller 104 includes a central processing unit (CPU) 122, a read-only memory (ROM) 124, a random access memory (RAM) 126, a storage unit 128, and the like. The CPU 122 is a processor of the system controller 104. The ROM 124 stores various programs and the RAM 126 is the working memory for various programs and data. The storage unit 128 includes a nonvolatile memory, such as a hard disk drive (HDD) or a flash memory, and stores various programs even if power is turned off. The CPU 122, the ROM 124, the RAM 126, and the storage unit 128 are interconnected via a bus 130. The system controller 104 executes a control program which is stored in the ROM 124 or the storage unit 128 and uses the RAM 126 as a working area. The control program will include software applications that include program code that may be executed by processor in order to perform various functionalities associated with receiving and analyzing data and controlling any and all aspects of the methods and hardware used to create the ion trap quantum computer system 100 discussed herein.

Figure 2:
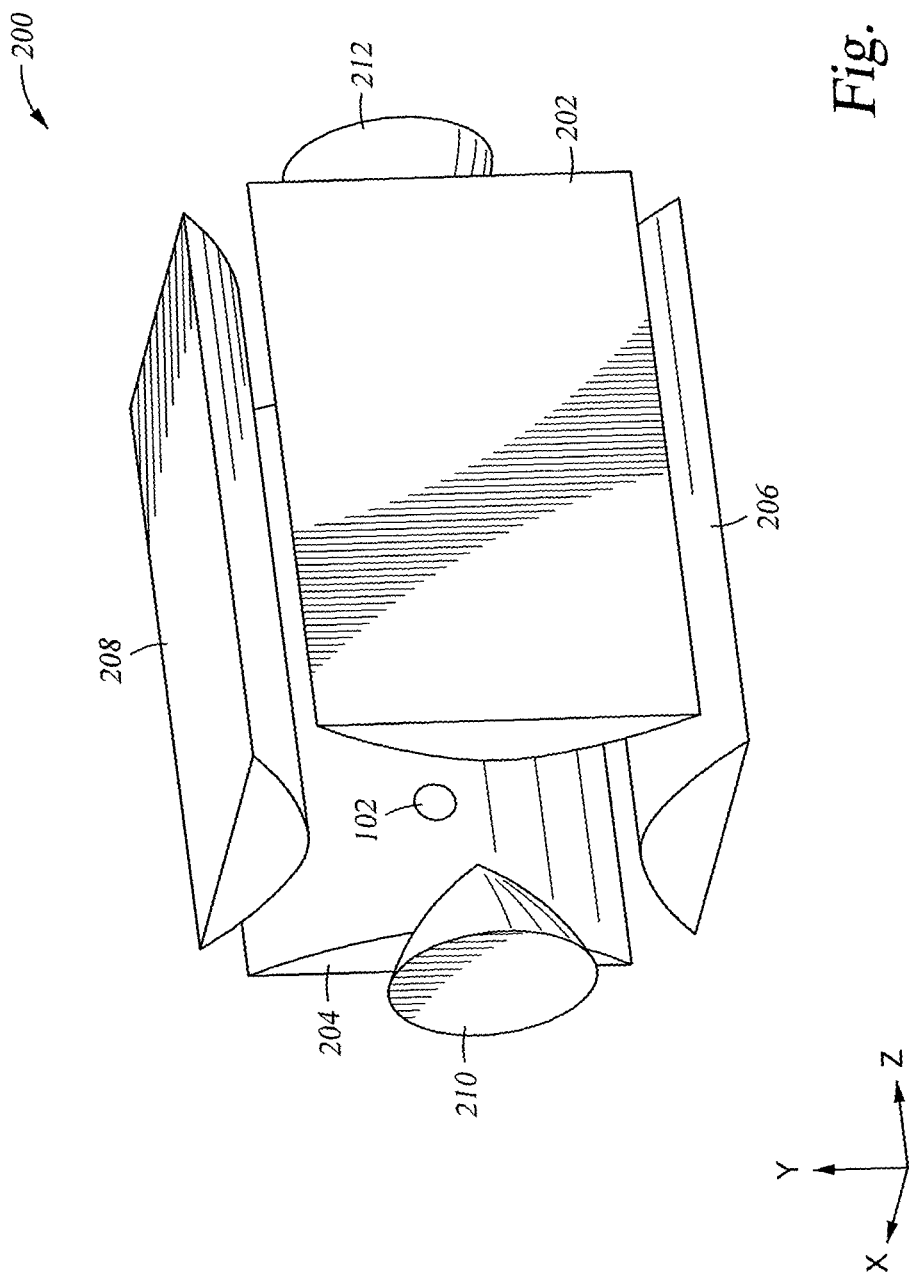
FIG. 2 depicts a schematic view of an ion trap for confining ions in a group according to one embodiment.

FIG. 2 depicts a schematic view of an ion trap 200 (also referred to as a Paul trap) for confining ions in the group 106 according to one embodiment. The confining potential is exerted by both static (DC) voltage and radio frequency (RF) voltages. A static (DC) voltage $V_S$ is applied to end-cap electrodes 210 and 212 to confine the ions along the Z-axis (also referred to as an "axial direction" or a "longitudinal direction"). The ions in the group 106 are nearly evenly distributed in the axial direction due to the Coulomb interaction between the ions. In some embodiments, the ion trap 200 includes four hyperbolically-shaped electrodes 202, 204, 206, and 208 extending along the Z-axis.

During operation, a sinusoidal voltage $V_1$ (with an amplitude $V_{RF}/2$) is applied to an opposing pair of the electrodes 202, 204 and a sinusoidal voltage $V_2$ with a phase shift of 180° from the sinusoidal voltage $V_1$ (and the amplitude $V_{RF}/2$) is applied to the other opposing pair of the electrodes 206, 208 at a driving frequency $\omega_{RF}$, generating a quadrupole potential. In some embodiments, a sinusoidal voltage is only applied to one opposing pair of the electrodes 202, 204, and the other opposing pair 206, 208 is grounded. The quadrupole potential creates an effective confining force in the X-Y plane perpendicular to the Z-axis (also referred to as a "radial direction" or "transverse direction") for each of the trapped ions, which is proportional to a distance from a saddle point (i.e., a position in the axial direction (Z-direction)) at which the RF electric field vanishes. The motion in the radial direction (i.e., direction in the X-Y plane) of each ion is approximated as a harmonic oscillation (referred to as secular motion) with a restoring force towards the saddle point in the radial direction and can be modeled by spring constants $k_x$ and $k_y$, respectively, as is discussed in greater detail below. In some embodiments, the spring constants in the radial direction are modeled as equal when the quadrupole potential is symmetric in the radial direction. However, undesirably in some cases, the motion of the ions in the radial direction may be distorted due to some asymmetry in the physical trap configuration, a small DC patch potential due to inhomogeneity of a surface of the electrodes, or the like and due to these and other external sources of distortion the ions may lie off-center from the saddle points.

Figure 3:
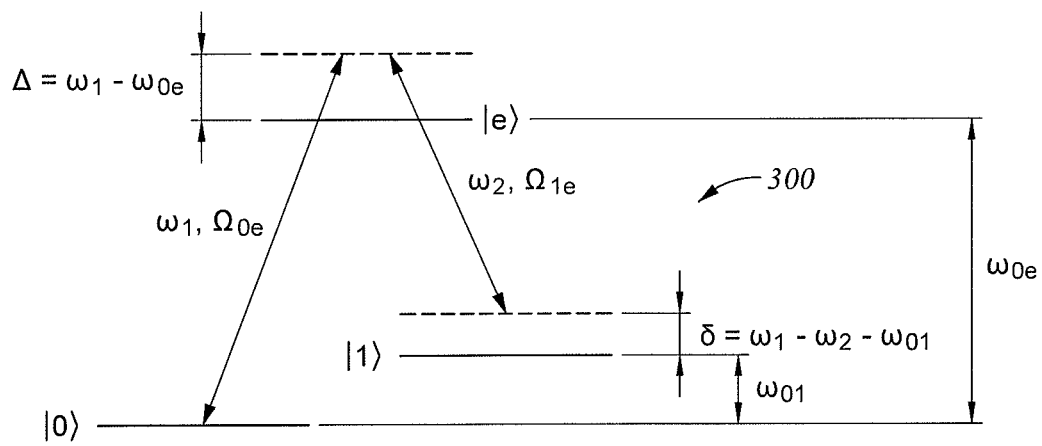
FIG. 3 depicts a schematic energy diagram of each ion in a group of trapped ions according to one embodiment.

FIG. 3 depicts a schematic energy diagram 300 of each ion in the group 106 of trapped ions according to one embodiment. In one example, each ion may be a positive Ytterbium ion, $^{171}Yb^+$, which has the $^2S_{1/2}$ hyperfine states (i.e., two electronic states) with an energy split corresponding to a frequency difference (referred to as a "carrier frequency") of $\omega_{01}/2\pi=12.642821$ GHz. A qubit is formed with the two hyperfine states, denoted as $|0\rangle$ and $|1\rangle$, where the hyperfine ground state (i.e., the lower energy state of the $^2S_{1/2}$ hyperfine states) is chosen to represent $|0\rangle$. Hereinafter, the terms "hyperfine states," "internal hyperfine states," and "qubits" may be interchangeably used to represent $|0\rangle$ and $|1\rangle$. Each ion may be cooled (i.e., kinetic energy of the ion may be reduced) to near the motional ground state $|0\rangle_m$ for any motional mode m with no phonon excitation (i.e., $n_{ph}=0$) by known laser cooling methods, such as Doppler cooling or resolved sideband cooling, and then the qubit state prepared in the hyperfine ground state $|0\rangle$ by optical pumping. Here, $|0\rangle$ represents the individual qubit state of a trapped ion whereas $|0\rangle_m$ with the subscript m denotes the motional ground state for a motional mode m of a group 106 of trapped ions.

An individual qubit state of each trapped ion may be manipulated by, for example, a mode-locked laser at 355 nanometers (nm) via the excited $^2P_{1/2}$ level (denoted as $|e\rangle$). As shown in FIG. 3, a laser beam from the laser may be split into a pair of non-copropagating laser beams (a first laser beam with frequency $\omega_1$ and a second laser beam with frequency $\omega_2$) in the Raman configuration, and detuned by a one-photon transition detuning frequency $\Delta=\omega_1-\omega_{0e}$ with respect to the transition frequency $\omega_{0e}$ between $|0\rangle$ and $|e\rangle$, as illustrated in FIG. 3. A two-photon transition detuning frequency $\delta$ includes adjusting the amount of energy that is provided to the trapped ion by the first and second laser beams, which when combined is used to cause the trapped ion to transfer between the hyperfine states $|0\rangle$ and $|1\rangle$. When the one-photon transition detuning frequency $\Delta$ is much larger than a two-photon transition detuning frequency (also referred to simply as "detuning frequency") $\delta=\omega_1-\omega_2-\omega_{01}$ (hereinafter denoted as $\pm\mu$, $\mu$ being a positive value), single-photon Rabi frequencies $\Omega_{0e}(t)$ and $\Omega_{1e}(t)$ (which are time-dependent, and are determined by amplitudes and phases of the first and second laser beams), at which Rabi flopping between states $|0\rangle$ and $|e\rangle$ and between states $|1\rangle$ and $|e\rangle$ respectively occur, and a spontaneous emission rate from the excited state $|e\rangle$, Rabi flopping between the two hyperfine states $|0\rangle$ and $|1\rangle$ (referred to as a "carrier transition") is induced at the two-photon Rabi frequency $\Omega(t)$. The two-photon Rabi frequency $\Omega(t)$ has an intensity (i.e., absolute value of amplitude) that is proportional to $\Omega_{0e}\Omega_{1e}/2\Delta$, where $\Omega_{0e}$ and $\Omega_{1e}$ are the single-photon Rabi frequencies due to the first and second laser beams, respectively. Hereinafter, this set of non-copropagating laser beams in the Raman configuration to manipulate internal hyperfine states of qubits (qubit states) may be referred to as a "composite pulse" or simply as a "pulse," and the resulting time-dependent pattern of the two-photon Rabi frequency $\Omega(t)$ may be referred to as an "amplitude" of a pulse or simply as a "pulse," which are illustrated and further described below. The detuning frequency $\delta=\omega_1-\omega_2-\omega_{01}$ may be referred to as detuning frequency of the composite pulse or detuning frequency of the pulse. The amplitude of the two-photon Rabi frequency $\Omega(t)$, which is determined by amplitudes of the first and second laser beams, may be referred to as an "amplitude" of the composite pulse.

It should be noted that the particular atomic species used in the discussion provided herein is just one example of atomic species which has stable and well-defined two-level energy structures when ionized and an excited state that is optically accessible, and thus is not intended to limit the possible configurations, specifications, or the like of an ion trap quantum computer according to the present disclosure. For example, other ion species include alkaline earth metal ions ($Be^+$, $Ca^+$, $Sr^+$, $Mg+$, and $Ba^+$) or transition metal ions ($Zn^+$, $Hg^+$, $Cd^+$).

Figure 4:
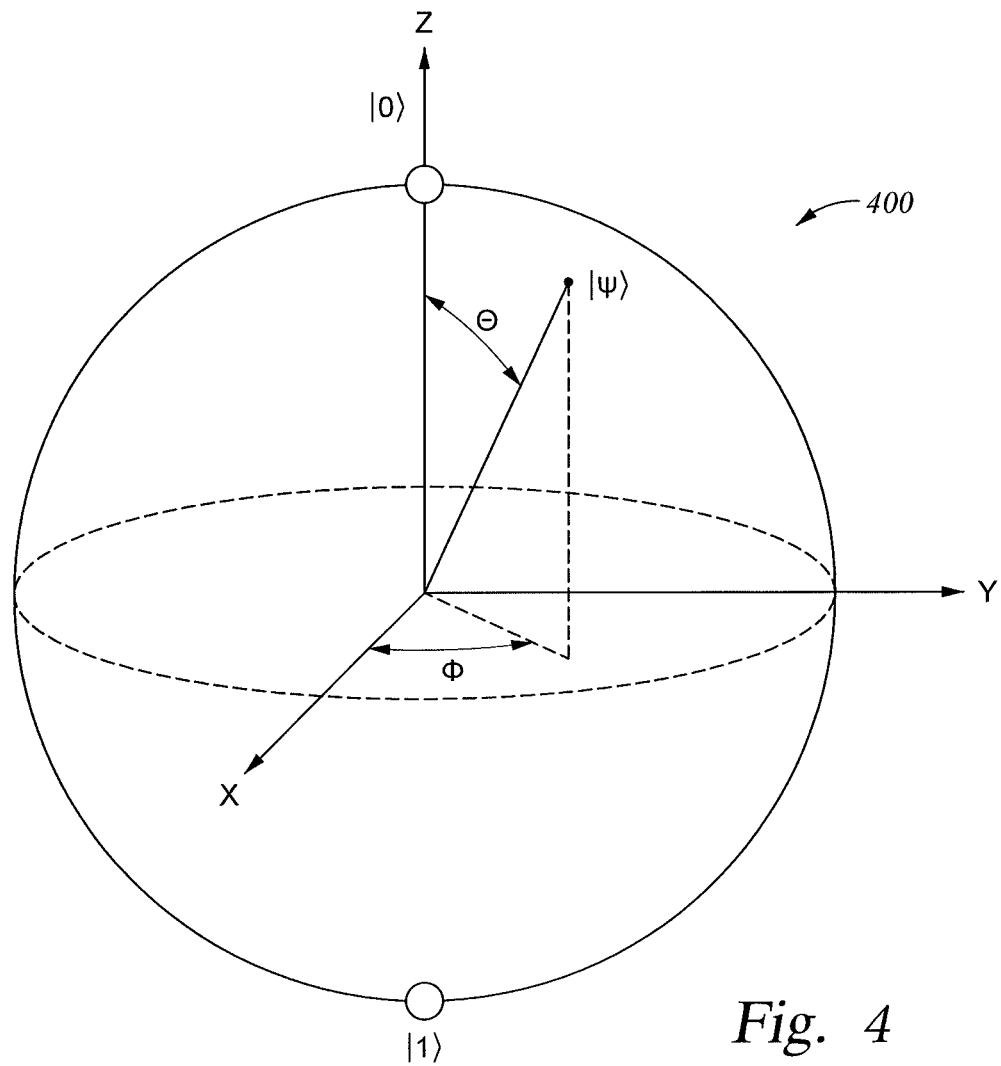
FIG. 4 depicts a qubit state of an ion represented as a point on a surface of the Bloch sphere.

FIG. 4 is provided to help visualize a qubit state of an ion is represented as a point on a surface of the Bloch sphere 400 with an azimuthal angle $\phi$ and a polar angle $\theta$. Application of the composite pulse as described above, causes Rabi flopping between the qubit state $|0\rangle$ (represented as the north pole of the Bloch sphere) and $|1\rangle$ (the south pole of the Bloch sphere) to occur. Adjusting time duration and amplitudes of the composite pulse flips the qubit state from $|0\rangle$ to $|1\rangle$ (i.e., from the north pole to the south pole of the Bloch sphere), or the qubit state from $|1\rangle$ to $|0\rangle$ (i.e., from the south pole to the north pole of the Bloch sphere). This application of the composite pulse is referred to as a "π-pulse". Further, by adjusting time duration and amplitudes of the composite pulse, the qubit state $|0\rangle$ may be transformed to a superposition state $|0\rangle+|1\rangle$, where the two qubit states $|0\rangle$ and $|1\rangle$ are added and equally-weighted in-phase (a normalization factor of the superposition state is omitted hereinafter without loss of generality) and the qubit state $|1\rangle$ to a superposition state $|0\rangle-|1\rangle$, where the two qubit states $|0\rangle$ and $|1\rangle$ are added equally-weighted but out of phase. This application of the composite pulse is referred to as a "π/2-pulse". More generally, a superposition of the two qubits states $|0\rangle$ and $|1\rangle$ that are added and equally-weighted is represented by a point that lies on the equator of the Bloch sphere. For example, the superposition states $|0\rangle\pm|1\rangle$ correspond to points on the equator with the azimuthal angle $\phi$ being zero and π, respectively. The superposition states that correspond to points on the equator with the azimuthal angle $\phi$ are denoted as $|0\rangle+e^{i\phi}|1\rangle$ (e.g., $|0\rangle\pm i|1\rangle$ for $\phi=\pm\pi/2$). Transformation between two points on the equator (i.e., a rotation about the Z-axis on the Bloch sphere) can be implemented by shifting phases of the composite pulse.

Entanglement Formation

Figure 5A:
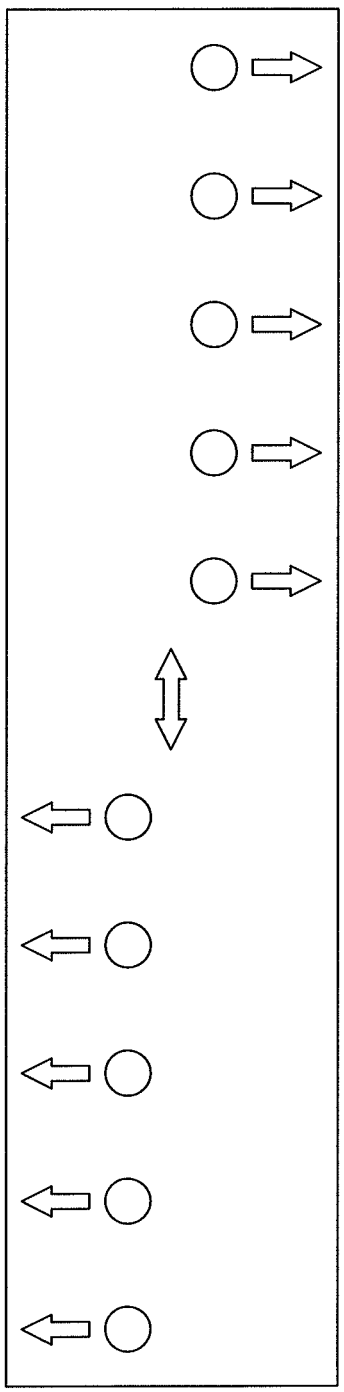
FIGS. 5A, 5B, and 5C depict a few schematic collective transverse motional mode structures of a group of five trapped ions.
Figure 5B:
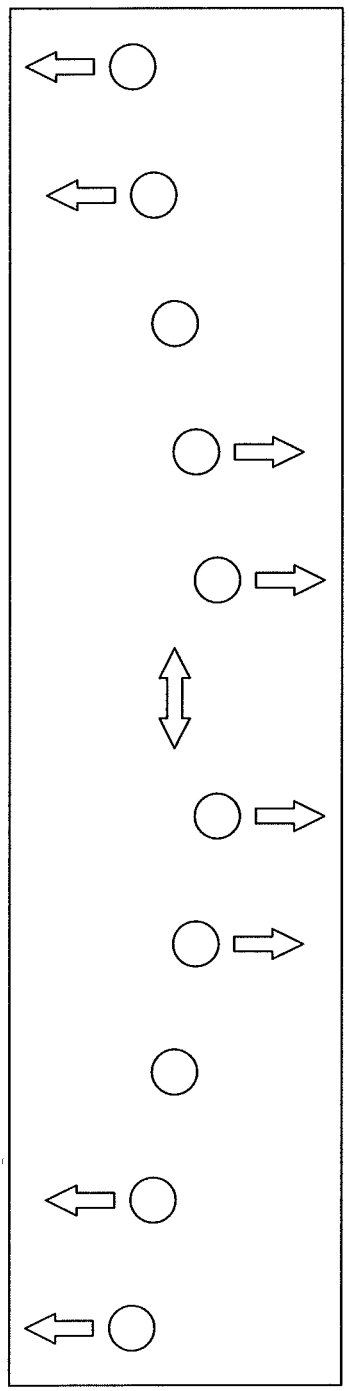
Figure 5C:
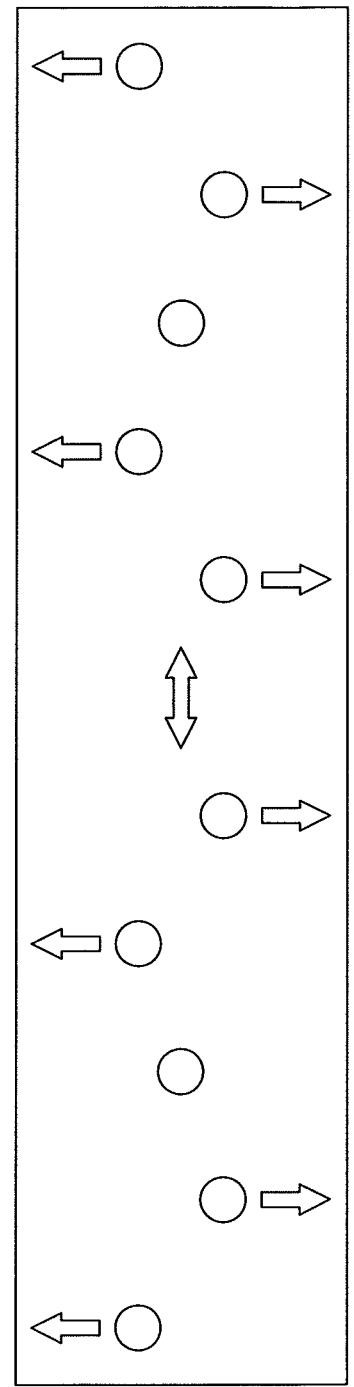

FIGS. 5A, 5B, and 5C depict a few schematic structures of collective transverse motional modes (also referred to simply as "motional mode structures") of a group 106 of five trapped ions, for example. Here, the confining potential due to a static voltage $V_S$ applied to the end-cap electrodes 210 and 212 is weaker compared to the confining potential in the radial direction. The collective motional modes of the group 106 of trapped ions in the transverse direction are determined by the Coulomb interaction between the trapped ions combined with the confining potentials generated by the ion trap 200. The trapped ions undergo collective transversal motions (referred to as "collective transverse motional modes," "collective motional modes," or simply "motional modes"), where each mode has a distinct energy (or equivalently, a frequency) associated with it. A motional mode having the m-th lowest energy is hereinafter referred to as $|n_{ph}\rangle_m$, where $n_{ph}$ denotes the number of motional quanta (in units of energy excitation, referred to as phonons) in the motional mode, and the number of motional modes M in a given transverse direction is equal to the number of trapped ions N in the group 106. FIGS. 5A-5C schematically illustrates examples of different types of collective transverse motional modes that may be experienced by five trapped ions that are positioned in a group 106. FIG. 5A is a schematic view of a common motional mode $|n_{ph}\rangle_M$ having the highest energy, where M is the number of motional modes. In the common motional mode $|n\rangle_M$, all ions oscillate in phase in the transverse direction. FIG. 5B is a schematic view of a tilt motional mode $|n_{ph}\rangle_{M-1}$ which has the second highest energy. In the tilt motional mode, ions on opposite ends move out of phase in the transverse direction (i.e., in opposite directions). FIG. 5C is a schematic view of a higher-order motional mode $|n_{ph}\rangle_{M-3}$ which has a lower energy than that of the tilt motional mode $|n_{ph}\rangle_{M-1}$, and in which the ions move in a more complicated mode pattern.

It should be noted that the particular configuration described above is just one among several possible examples of a trap for confining ions according to the present disclosure and does not limit the possible configurations, specifications, or the like of traps according to the present disclosure. For example, the geometry of the electrodes is not limited to the hyperbolic electrodes described above. In other examples, a trap that generates an effective electric field causing the motion of the ions in the radial direction as harmonic oscillations may be a multi-layer trap in which several electrode layers are stacked and an RF voltage is applied to two diagonally opposite electrodes, or a surface trap in which all electrodes are located in a single plane on a chip. Furthermore, a trap may be divided into multiple segments, adjacent pairs of which may be linked by shuttling one or more ions, or coupled by photon interconnects. A trap may also be an array of individual trapping regions arranged closely to each other on a micro-fabricated ion trap chip. In some embodiments, the quadrupole potential has a spatially varying DC component in addition to the RF component described above.

Figure 6A:
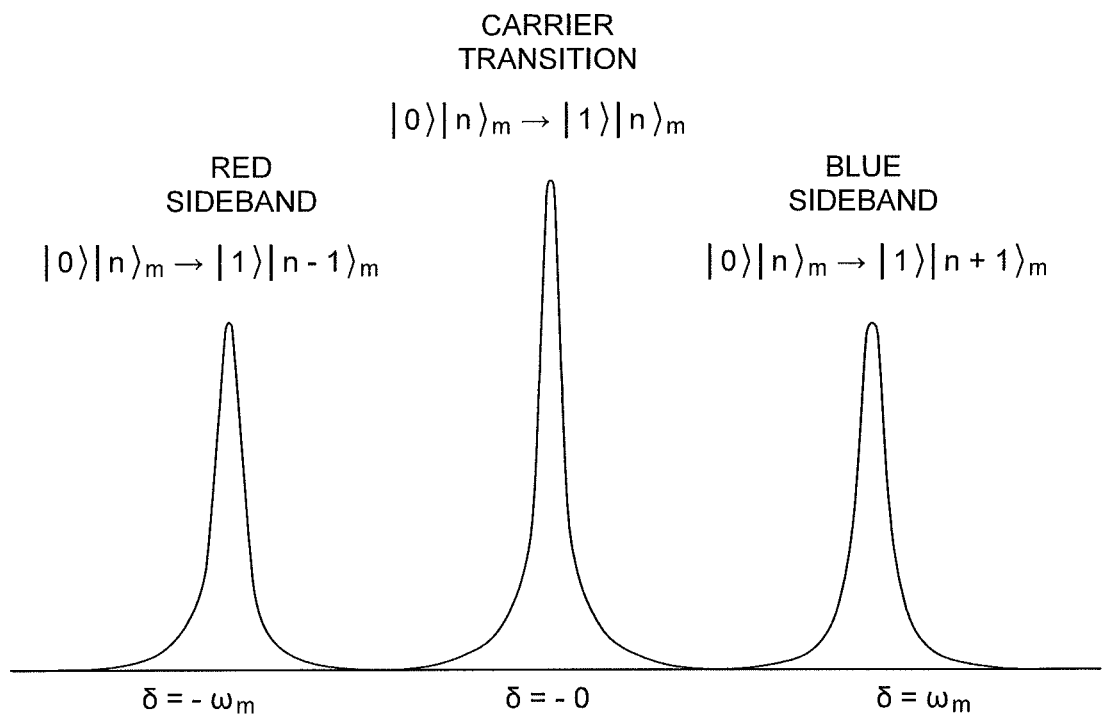
FIGS. 6A and 6B depict schematic views of motional sideband spectrum of each ion and a motional mode according to one embodiment.
Figure 6B:
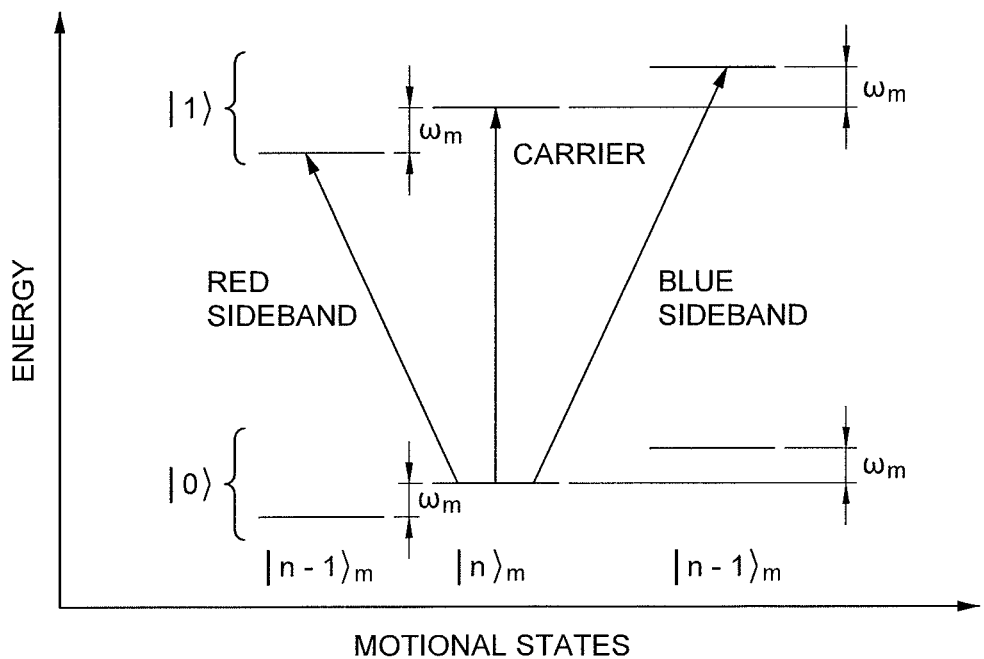

In an ion trap quantum computer, the motional modes may act as a data bus to mediate entanglement between two qubits and this entanglement is used to perform an XX gate operation. That is, each of the two qubits is entangled with the motional modes, and then the entanglement is transferred to an entanglement between the two qubits by using motional sideband excitations, as described below. FIGS. 6A and 6B schematically depict views of a motional sideband spectrum for an ion in the group 106 in a motional mode $|n_{ph}\rangle_M$ having frequency $\omega_m$ according to one embodiment. As illustrated in FIG. 6B, when the detuning frequency of the composite pulse is zero (i.e., a frequency difference between the first and second laser beams is tuned to the carrier frequency, $\delta=\omega_1-\omega_2-\omega_{01}=0$), simple Rabi flopping between the qubit states $|0\rangle$ and $|1\rangle$ (carrier transition) occurs. When the detuning frequency of the composite pulse is positive (i.e., the frequency difference between the first and second laser beams is tuned higher than the carrier frequency, $\delta=\omega_1-\omega_2-\omega_{01}=\mu>0$, referred to as a blue sideband), Rabi flopping between combined qubit-motional states $|0\rangle|n_{ph}\rangle_m$ and $|1\rangle|n_{ph}+1\rangle_m$ occurs (i.e., a transition from the m-th motional mode with n-phonon excitations denoted by $|n_{ph}\rangle_m$ to the m-th motional mode with $(n_{ph}+1)$-phonon excitations denoted by $|n_{ph}+1\rangle_m$ occurs when the qubit state $|0\rangle$ flips to $|1\rangle$). When the detuning frequency of the composite pulse is negative (i.e., the frequency difference between the first and second laser beams is tuned lower than the carrier frequency by the frequency $\omega_m$ of the motional mode $|n_{ph}\rangle_m$, $\delta=\omega_1-\omega_2-\omega_{01}=-\mu<0$, referred to as a red sideband), Rabi flopping between combined qubit-motional states $|0\rangle|n_{ph}\rangle_m$ and $|1\rangle|n_{ph}-1\rangle_m$ occurs (i.e., a transition from the motional mode $|n_{ph}\rangle_m$ to the motional mode $|n_{ph}-1\rangle_m$ with one less phonon excitations occurs when the qubit state $|0\rangle$ flips to $|1\rangle$). A π/2-pulse on the blue sideband applied to a qubit transforms the combined qubit-motional state $|0\rangle|n_{ph}\rangle_m$ into a superposition of $|0\rangle|n_{ph}\rangle_m$ and $|1\rangle|n_{ph}+1\rangle_m$. A π/2-pulse on the red sideband applied to a qubit transforms the combined qubit-motional $|0\rangle|n_{ph}\rangle_m$ into a superposition of $|0\rangle|n_{ph}\rangle_m$ and $|1\rangle|n_{ph}-1\rangle_m$. When the two-photon Rabi frequency $\Omega(t)$ is smaller as compared to the detuning frequency $\delta=\omega_1-\omega_2-\omega_{01}=\pm\mu$, the blue sideband transition or the red sideband transition may be selectively driven. Thus, qubit states of a qubit can be entangled with a desired motional mode by applying the right type of pulse, such as a π/2-pulse, which can be subsequently entangled with another qubit, leading to an entanglement between the two qubits that is needed to perform an XX-gate operation in an ion trap quantum computer.

By controlling and/or directing transformations of the combined qubit-motional states as described above, an XX-gate operation may be performed on two qubits (i-th and j-th qubits). In general, the XX-gate operation (with maximal entanglement) respectively transforms two-qubit states $|0\rangle_i|0\rangle_j$, $|0\rangle_i|1\rangle_j$, $|1\rangle_i|0\rangle_j$, and as follows:

$$|0\rangle_i|0\rangle_j \rightarrow |0\rangle_i|0\rangle_j - i|1\rangle_i|1\rangle_j$$

$$|0\rangle_i|1\rangle_j \rightarrow |0\rangle_i|1\rangle_j - i|1\rangle_i|0\rangle_j$$

$$|1\rangle_i|0\rangle_j \rightarrow -i|0\rangle_i|1\rangle_j + |1\rangle_i|0\rangle_j$$

$$|1\rangle_i|1\rangle_j \rightarrow -i|0\rangle_i|1\rangle_j + |1\rangle_i|1\rangle_j.$$

For example, when the two qubits (i-th and j-th qubits) are both initially in the hyperfine ground state $|0\rangle$ (denoted as $|0\rangle_i|0\rangle_j$) and subsequently a π/2-pulse on the blue sideband is applied to the i-th qubit, the combined state of the i-th qubit and the motional mode $|0\rangle_i|n_{ph}\rangle_m$ is transformed into a superposition of $|0\rangle_i|n_{ph}\rangle_m$ and $|1\rangle_i|n_{ph}+1\rangle_m$, and thus the combined state of the two qubits and the motional mode is transformed into a superposition of $|0\rangle_i|0\rangle_j|n_{ph}\rangle_m$ and $|1\rangle_i|0\rangle_j|n_{ph}+1\rangle_m$. When a π/2-pulse on the red sideband is applied to the j-th qubit, the combined state of the j-th qubit and the motional mode $|0\rangle_j|n_{ph}\rangle_m$ is transformed to a superposition of $|0\rangle_j|n_{ph}\rangle_m$ and $|1\rangle_j|n_{ph}-1\rangle_m$ and the combined state $|0\rangle_j|n_{ph}+1\rangle_m$ is transformed into a superposition of $|0\rangle_j|n_{ph}+1\rangle_m$ and.

Thus, applications of a π/2-pulse on the blue sideband on the i-th qubit and a π/2-pulse on the red sideband on the j-th qubit may transform the combined state of the two qubits and the motional mode $|0\rangle_i|0\rangle_j|n_{ph}\rangle_m$ into a superposition of $|0\rangle_i|0\rangle_j|n_{ph}\rangle_m$ and $|1\rangle_i|1\rangle_j|n_{ph}\rangle_m$, the two qubits now being in an entangled state. For those of ordinary skill in the art, it should be clear that two-qubit states that are entangled with motional mode having a different number of phonon excitations from the initial number of phonon excitations $n_{ph}$ (i.e., $|1\rangle_i|0\rangle_j|n_{ph}+1\rangle_m$ and $|0\rangle_i|1\rangle_j|n_{ph}-1\rangle_m$) can be removed by a sufficiently complex pulse sequence, and thus the combined state of the two qubits and the motional mode after the XX-gate operation may be considered disentangled as the initial number of phonon excitations $n_{ph}$ in the m-th motional mode stays unchanged at the end of the XX-gate operation. Thus, qubit states before and after the XX-gate operation will be described below generally without including the motional modes.

More generally, the combined state of i-th and j-th qubits transformed by the application of pulses on the sidebands for duration τ (referred to as a "gate duration"), having amplitudes $\Omega^{(i)}$ and $\Omega^{(j)}$ and detuning frequency μ, can be described in terms of an entangling interaction $\chi^{(i,j)}(\tau)$ as follows:

$$|0\rangle_i|0\rangle_j \rightarrow \cos(2\chi^{(i,j)}(\tau))|0\rangle_i|0\rangle_j - i\sin(2\chi^{(i,j)}(\tau))|1\rangle_i|1\rangle_j$$

$$|0\rangle_i|1\rangle_j \rightarrow \cos(2\chi^{(i,j)}(\tau))|0\rangle_i|1\rangle_j - i\sin(2\chi^{(i,j)}(\tau))|1\rangle_i|0\rangle_j$$

$$|1\rangle_i|0\rangle_j \rightarrow -i\sin(2\chi^{(i,j)}(\tau))|0\rangle_i|1\rangle_{nj} + \cos(2\chi^{(i,j)}(\tau))|1\rangle_i|0\rangle_j$$

$$|1\rangle_i|1\rangle_j \rightarrow -i\sin(2\chi^{(i,j)}(\tau))|0\rangle_i|0\rangle_j + \cos(2\chi^{(i,j)}(\tau))|1\rangle_i|1\rangle_j$$

where, $$\chi^{(i,j)}(\tau) = -4\sum_{m=1}^{M}\eta_m^{(i)}\eta_m^{(j)}\int_0^\tau dt_2 \int_0^{t_2} dt_1 \Omega^{(i)}(t_2)\Omega^{(j)}(t_1)\cos(\mu t_2)\cos(\mu t_1)\sin[\omega_m(t_2-t_1)]$$

and $\eta_m^{(i)}$ is the Lamb-Dicke parameter that quantifies the coupling strength between the i-th ion and the m-th motional mode having the frequency $\omega_m$, and M is the number of the motional modes (equal to the number N of ions in the group 106).

The entanglement interaction between two qubits described above can be used to perform an XX-gate operation. The XX-gate operation (XX gate) along with single-qubit operations (R gates) forms a set of gates {R, XX} that can be used to build a quantum computer that is configured to perform desired computational processes. Among several known sets of logic gates by which any quantum algorithm can be decomposed, a set of logic gates, commonly denoted as {R, XX}, is native to a quantum computing system of trapped ions described herein. Here, the R gate corresponds to manipulation of individual qubit states of trapped ions, and the XX gate (also referred to as an "entangling gate") corresponds to manipulation of the entanglement of two trapped ions.

To perform an XX-gate operation between i-th and j-th qubits, pulses that satisfy the condition $\chi^{(i,j)}(\tau)=\theta^{(i,j)}$ ($0<\theta^{(i,j)}\leq\pi/8$) (i.e., the entangling interaction $\chi^{(i,j)}(\tau)$ has a desired value $\theta^{(i,j)}$, referred to as condition for a non-zero entanglement interaction) are constructed and applied to the i-th and the j-th qubits. The transformations of the combined state of the i-th and the j-th qubits described above corresponds to the XX-gate operation with maximal entanglement when $\theta^{(i,j)}=\pi/8$. Amplitudes $\Omega^{(i)}(t)$ and $\Omega^{(j)}(t)$ of the pulses to be applied to the i-th and the j-th qubits are control parameters that can be adjusted to ensure a non-zero tunable entanglement of the i-th and the j-th qubits to perform a desired XX gate operation on i-th and j-th qubits.

Hybrid Quantum-Classical Computing System

While currently available quantum computers may be noisy and prone to errors, a combination of both quantum and classical computers, in which a quantum computer is a domain-specific accelerator, may be able to solve optimization problems that are beyond the reach of classical computers. An example of such optimization problems is quantum chemistry, where Variational Quantum Eigensolver (VQE) algorithms perform a search for the lowest energy (or an energy closest to the lowest energy) of a many-particle quantum system, such as a large molecules chemical compound and the corresponding state (e.g. a configuration of the interacting electrons or spins) by iterating computations between a quantum processor and a classical computer. A many-particle quantum system in quantum theory is described by a model Hamiltonian and the energy of the many-particle quantum system corresponds to the expectation value of the model Hamiltonian. In such algorithms, a configuration of electrons or spins that is best known approximation calculated by the classical computer is input to the quantum processor as a trial state and the energy of the trial state is estimated using the quantum processor. The classical computer receives this estimate, modifies the trial state by a known classical optimization algorithm, and returns the modified trial state back to the quantum processor. This iteration is repeated until the estimate received from the quantum processor is within a predetermined accuracy. A trial function (i.e., a possible configuration of electrons or spins of the many-particle quantum system) would require exponentially large resource to represent on a classical computer, as the number of electrons or spins of the many-particle quantum system of interest, but only require linearly-increasing resource on a quantum processor. Thus, the quantum processor acts as an accelerator for the energy estimation sub-routine of the computation. By solving for a configuration of electrons or spins having the lowest energy under different configurations and constraints, a range of molecular reactions can be explored as part of the solution to this type of optimization problem for example.

Another example optimization problem is in solving combinatorial optimization problems, where Quantum Approximate Optimization Algorithm (QAOA) perform search for optimal solutions from a set of possible solutions according to some given criteria, using a quantum computer and a classical computer. The combinatorial optimization problems that can be solved by the methods described herein may include the PageRank (PR) problem for ranking web pages in search engine results and the maximum-cut (Max-Cut) problem with applications in clustering, network science, and statistical physics. The MaxCut problem aims at grouping nodes of a graph into two partitions by cutting across links between them in such a way that a weighted sum of intersected edges is maximized. The combinatorial optimization problems that can be solved by the methods described herein may further include the travelling salesman problem for finding shortest and/or cheapest round trips visiting all given cities. The travelling salesman problem is applied to scheduling a printing press for a periodical with multi-editions, scheduling school buses minimizing the number of routes and total distance while no bus is overloaded or exceeds a maximum allowed policy, scheduling a crew of messengers to pick up deposit from branch banks and return the deposit to a central bank, determining an optimal path for each army planner to accomplish the goals of the mission in minimum possible time, designing global navigation satellite system (GNSS) surveying networks, and the like. Another combinatorial optimization problem is the knapsack problem to find a way to pack a knapsack to get the maximum total value, given some items. The knapsack problem is applied to resource allocation given financial constraints in home energy management, network selection for mobile nodes, cognitive radio networks, sensor selection in distributed multiple radar, or the like.

A combinatorial optimization problem is modeled by an objective function (also referred to as a cost function) that maps events or values of one or more variables onto real numbers representing "cost" associated with the events or values and seeks to minimize the cost function. In some cases, the combinatorial optimization problem may seek to maximize the objective function. The combinatorial optimization problem is further mapped onto a simple physical system described by a model Hamiltonian (corresponding to the sum of kinetic energy and potential energy of all particles in the system) and the problem seeks the low-lying energy state of the physical system, as in the case of the Variational Quantum Eigensolver (VQE) algorithm.

This hybrid quantum-classical computing system has at least the following advantages. First, an initial guess is derived from a classical computer, and thus the initial guess does not need to be constructed in a quantum processor that may not be reliable due to inherent and unwanted noise in the system. Second, a quantum processor performs a small-sized (e.g., between a hundred qubits an a few thousand qubits) but accelerated operation (that can be performed using a small number of quantum logic gates) between an input of a guess from the classical computer and a measurement of a resulting state, and thus a NISQ device can execute the operation without accumulating errors. Thus, the hybrid quantum-classical computing system may allow challenging problems to be solved, such as small but challenging combinatorial optimization problems, which are not practically feasible on classical computers, or suggest ways to speed up the computation with respect to the results that would be achieved using the best known classical algorithm.

Figure 7:
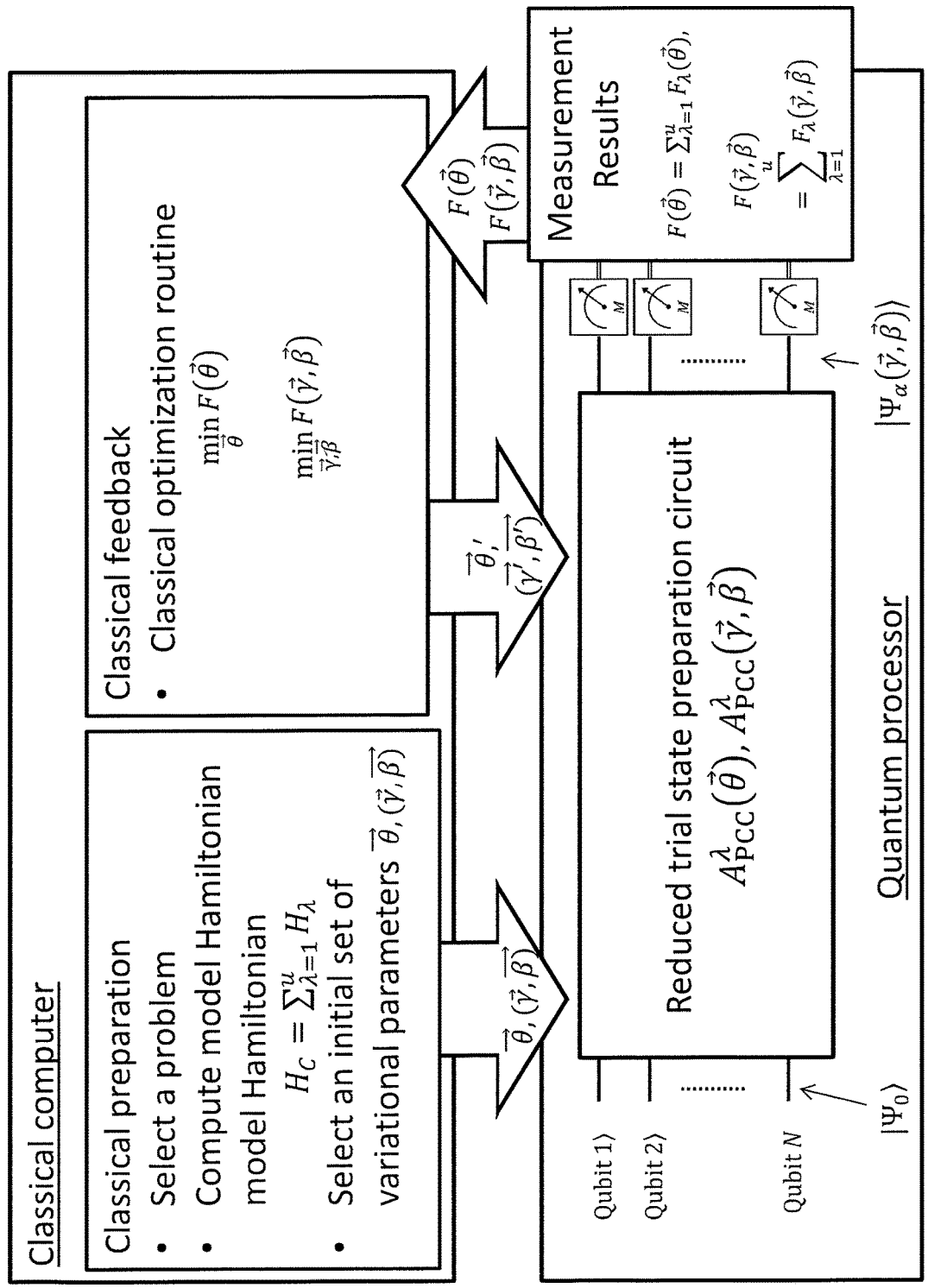
FIG. 7 depicts an overall hybrid quantum-classical computing system for obtaining a solution to an optimization problem by Variational Quantum Eigensolver (VQE) algorithm or Quantum Approximate Optimization Algorithm (QAOA) according to one embodiment.
Figure 8:
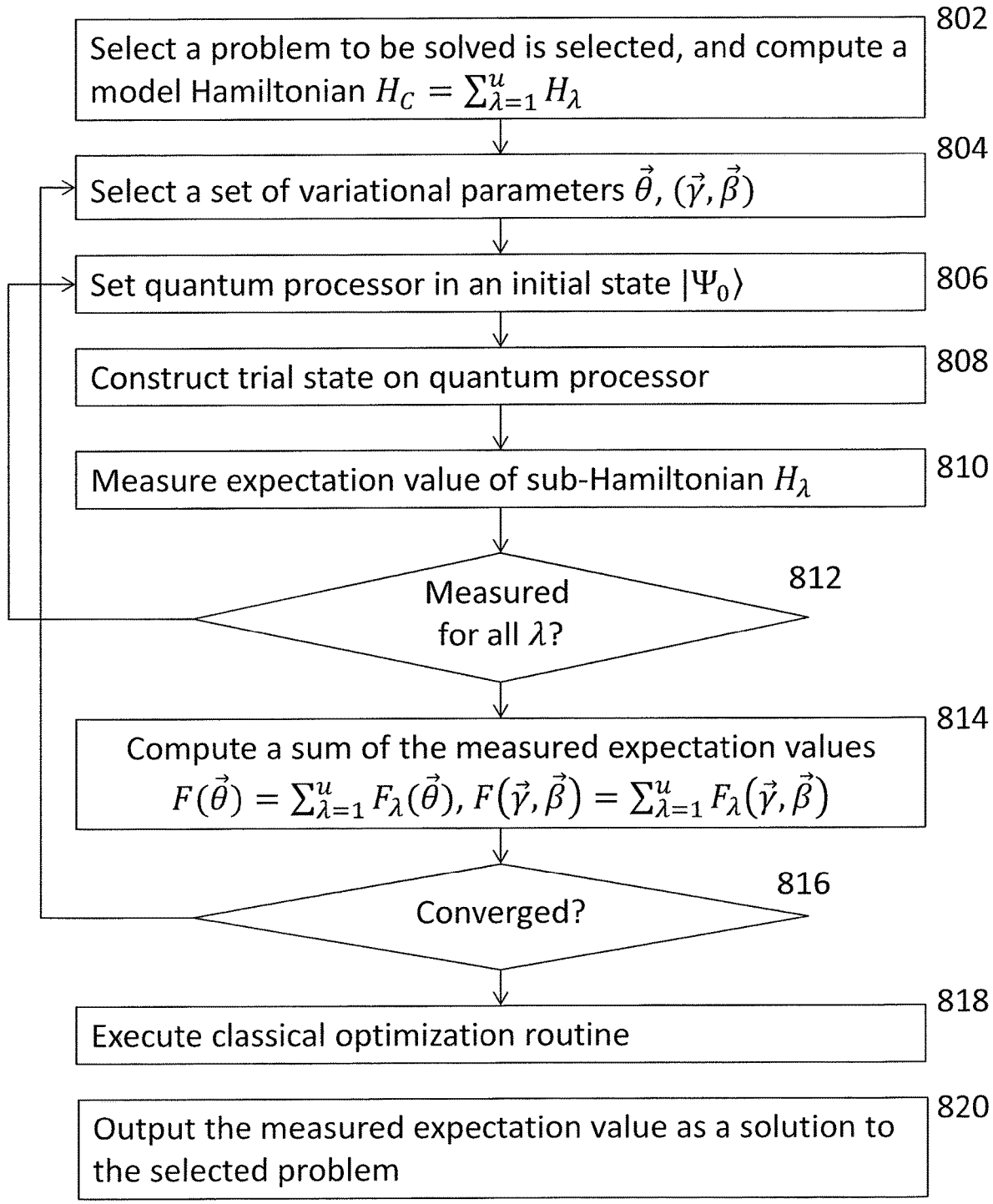
FIG. 8 depicts a flowchart illustrating a method of obtaining a solution to an optimization problem by Variational Quantum Eigensolver (VQE) algorithm or Quantum Approximate Optimization Algorithm (QAOA) according to one embodiment.

FIGS. 7 and 8 depict an overall hybrid quantum-classical computing system 700 and a flowchart illustrating a method 800 of obtaining a solution to an optimization problem by Variational Quantum Eigensolver (VQE) algorithm or Quantum Approximate Optimization Algorithm (QAOA) according to one embodiment. In this example, the quantum processor is the group 106 of N trapped ions, in which the two hyperfine states of each of the N trapped ions form a qubit.

The VQE algorithm relies on a variational search by the well-known Rayleigh-Ritz variational principle. This principle can be used both for solving quantum chemistry problems by the VQE algorithm and combinatorial optimization problems solved by the QAOA. The variational method consists of iterations that include choosing a "trial state" of the quantum processor depending on a set of one or more parameters (referred to as "variational parameters") and measuring an expectation value of the model Hamiltonian (e.g., energy) of the trial state. A set of variational parameters (and thus a corresponding trial state) is adjusted and an optimal set of variational parameters are found that minimizes the expectation value of the model Hamiltonian (the energy). The resulting energy is an approximation to the exact lowest energy state. As the processes for obtaining a solution to an optimization problem by the VQE algorithm and by the QAOA, the both processes are described in parallel below In block 802, by the classical computer 102, an optimization problem to be solved by the VQE algorithm or the QAOA is selected, for example, by use of a user interface of the classical computer 102, or retrieved from the memory of the classical computer 102, and a model Hamiltonian $H_C$, which describes a many-particle quantum system in the quantum chemistry problem, or to which the selected combinatorial optimization problem is mapped, is computed.

In a quantum chemistry problem defined on an N-spin system, the system can be well described by a model Hamiltonian that includes quantum spins (each denoted by the third Pauli matrix $\sigma_i^z$) (i=1, 2, ..., N) and couplings among the quantum spins $\sigma_i^z$, $H_C = \Sigma_{\alpha=1}^t h_\alpha P_\alpha$, where $P_\alpha$ is a Pauli string (also referred to as a Pauli term) $P_\alpha = \sigma_1^{\alpha_1} \otimes \sigma_2^{\alpha_2} \otimes \ldots \sigma_N^{\alpha_N}$ and $\sigma_i^{\alpha_i}$ is either the identity operator I or the Pauli matrix $\sigma_i^X$, $\sigma_i^Y$, or $\sigma_i^Z$. Here t stands for the number of couplings among the quantum spins and $h_\alpha$ ($\alpha$=1, 2, ..., t) stands for the strength of the coupling $\alpha$. An N-electron system can be also described by the same model Hamiltonian $H_C = \Sigma_{\alpha=1}^t h_\alpha P_\alpha$. The goal is to find low-lying energy states of the model Hamiltonian $H_C$.

In a combinatorial optimization problem defined on a set of N binary variables with t constrains ($\alpha$=1, 2, ... t), the objective function is the number of satisfied clauses $C(z) = \Sigma_{\alpha=1}^t C_\alpha(z)$ or a weighted sum of satisfied clauses $C(z) = \Sigma_{\alpha=1}^t h_\alpha C_\alpha(z)$ ($h_\alpha$ corresponds to a weight for each constraint $\alpha$), where $z=z_1 z_2 \ldots z_N$ is a N-bit string and $C_\alpha(z)=1$ if z satisfies the constraint $\alpha$. The clause $C_\alpha(z)$ that describes the constraint $\alpha$ typically includes a small number of variables $z_i$. The goal is to minimize the objective function. Minimizing this objective function can be converted to finding a low-lying energy state of a model Hamiltonian $H_C = \Sigma_{\alpha=1}^t h_\alpha P_\alpha$ by mapping each binary variable $z_i$ to a quantum spin $\sigma_i^z$ and the constraints to the couplings among the quantum spins $\sigma_i^z$, where $P_\alpha$ is a Pauli string (also referred to as a Pauli term) $P_\alpha = \sigma_1^{\alpha_1} \otimes \sigma_2^{\alpha_2} \otimes \ldots \sigma_N^{\alpha_N}$ and $\sigma_i^{\alpha_i}$ is either the identity operator I or the Pauli matrix $\sigma_i^X$, $\sigma_i^Y$, or $\sigma_i^Z$. Here t stands for the number of couplings among the quantum spins and $h_\alpha$ ($\alpha=1, 2, \ldots, t$) stands for the strength of the coupling $\alpha$.

The quantum processor 106 has N qubits and each quantum spin $\sigma_i^z$ (i=1, 2, ..., N) is encoded in qubit i (i=1, 2, ..., N) in the quantum processor 106. For example, the spin-up and spin-down states of the quantum spin $\sigma_i^z$ are encoded as $|0\rangle$ and $|1\rangle$ of the qubit i.

In block 804, following the mapping of the selected combinatorial optimization problem onto a model Hamiltonian $H_C = \Sigma_{\alpha=1}^t h_\alpha P_\alpha$, a set of variational parameters ($\vec{\theta} = \theta_1, \theta_2, \ldots, \theta_N$ for the VQE algorithm, ($\vec{\gamma} = \gamma_1, \gamma_2, \ldots, \gamma_p$, $\vec{\beta} = \beta_1, \beta_2, \ldots, \beta_p$) for the QAOA) is selected, by the classical computer 102, to construct a sequence of gates (also referred to a "trial state preparation circuit") $A(\vec{\theta})$ for the VQE or A ($\vec{\gamma}, \vec{\beta}$) for the QAOA, which prepares the quantum processor 106 in a trial state $|\Psi(\vec{\theta})\rangle$ for the VQE or $|\Psi(\vec{\gamma}, \vec{\beta})\rangle$ for the QAOA. For the initial iteration, a set of variational parameters $\vec{\theta}$ in the VQE may be chosen randomly. In the QAOA, a set of variational parameters ($\vec{\gamma}, \vec{\beta}$) may be randomly chosen for the initial iteration.

This trial state $|\Psi(\vec{\theta})\rangle$, $|\Psi(\vec{\gamma}, \vec{\beta})\rangle$ is used to provide an expectation value of the model Hamiltonian $H_C$.

In the VQE algorithm, the trial state preparation circuit A($\vec{\theta}$) may be constructed by known methods, such as the unitary coupled cluster method, based on the model Hamiltonian $H_C$ and the selected set of variational parameters $\vec{\theta}$.

In the QAOA, the trial state preparation circuit A($\vec{\gamma}, \vec{\beta}$) includes p layers (i.e., p-time repetitions) of an entangling circuit $U(\gamma_l)$ that relates to the model Hamiltonian $H_C$ ($U(\gamma_l) = e^{-i\gamma_l H_C}$) and a mixing circuit $U_{Mix}(\beta_l)$ that relates to a mixing term $H_B = \Sigma_{i=1}^n \sigma_i^X$ ($U_{Mix}(\beta_l) = e^{-i\beta_l H_B}$) (l=1, 2, ..., p) as $$A(\vec{\gamma}, \vec{\beta}) = U_{Mix}(\beta_p) U_{Mix}(\beta_{p-1}) U(\gamma_{p-1}) \ldots U_{Mix}(\beta_1) U(\gamma_1).$$

Each term $\sigma_i^X$ in the mixing term $H_B$ corresponds to a $\pi/2$-pulse (as described above in relation to FIG. 4) applied to qubit i in the quantum processor 106.

To allow the application of the trial state preparation circuit A($\vec{\theta}$), A($\vec{\gamma}, \vec{\beta}$) on a NISQ device, the number of the quantum gate operations need to be small (i.e., shallow circuits) such that errors due to the noise in the NISQ device are not accumulated. However, as the problem size increases, the complexity of the trial state preparation circuit A($\vec{\theta}$), A($\vec{\gamma}, \vec{\beta}$) may increase rapidly, leading to deep circuits (i.e., an increased number of time steps required to execute gate operations in circuits to construct) required to construct the trial state preparation circuit A($\vec{\theta}$), A($\vec{\gamma}, \vec{\beta}$). Furthermore, some trial state preparation circuit A($\vec{\theta}$), A($\vec{\gamma}, \vec{\beta}$) that are designed hardware-efficiently with shallow circuits (i.e., a decreased number of time steps required to execute gate operations) may not provide a large enough variational search space to find the lowest energy of the model Hamiltonian $H_C$.

In the embodiments described herein, the terms in the model Hamiltonian $H_C$ are grouped into sub-Hamiltonians $H_\lambda$ ($\lambda=1, 2, \ldots, u$), where u is the number of sub-Hamiltonians (i.e., $H_C = \Sigma_{\lambda=1}^u H_\lambda$), and the trial state preparation circuit A($\vec{\theta}$), A($\vec{\gamma}, \vec{\beta}$) is replaced with a reduced state preparation circuit $A_{PCC}^\lambda(\vec{\theta})$, $A_{PCC}^\lambda(\vec{\gamma}, \vec{\beta})$ to evaluate an expectation value of each sub-Hamiltonian $H_\lambda$. The reduced state preparation circuit $A_{PCC}^\lambda(\vec{\theta})$, $A_{PCC}^\lambda(\vec{\gamma}, \vec{\beta})$ for a sub-Hamiltonian $H_\lambda$ is constructed by a set of gate operations that can influence an expectation value of the sub-Hamiltonian $H_\lambda$ (referred to as the past causal cone (PCC) of the sub-Hamiltonian). Other gate operations (that do not influence the expectation value of the sub-Hamiltonian $H_\lambda$) in the trial state preparation circuit A($\vec{\theta}$), A($\vec{\gamma}, \vec{\beta}$) are removed in the reduced state preparation circuits $A_{PCC}^\lambda(\vec{\theta})$, $A_{PCC}^\lambda(\vec{\gamma}, \vec{\beta})$. In some embodiments, sub-Hamiltonians $H_\lambda$ of the model Hamiltonian $H_C$ may respectively correspond to Pauli terms $P_\alpha$ in the model Hamiltonian $H_C$. In some embodiments, a sub-Hamiltonian $H_\lambda$ is a collection of more than one Pauli terms $P_\alpha$ in the model Hamiltonian $H_C$.

Figure 9A:
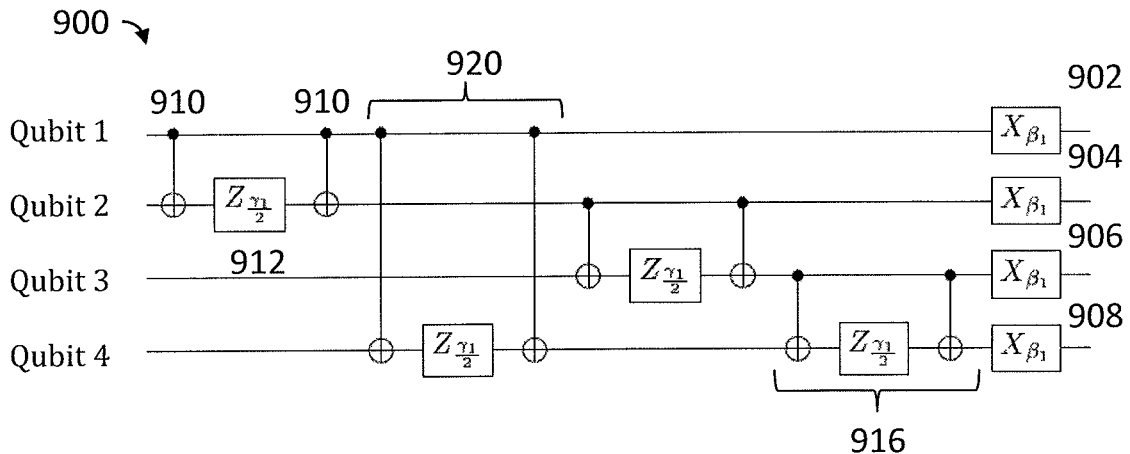
FIG. 9A illustrates a trial state preparation circuit according to one embodiment.
Figure 9B:
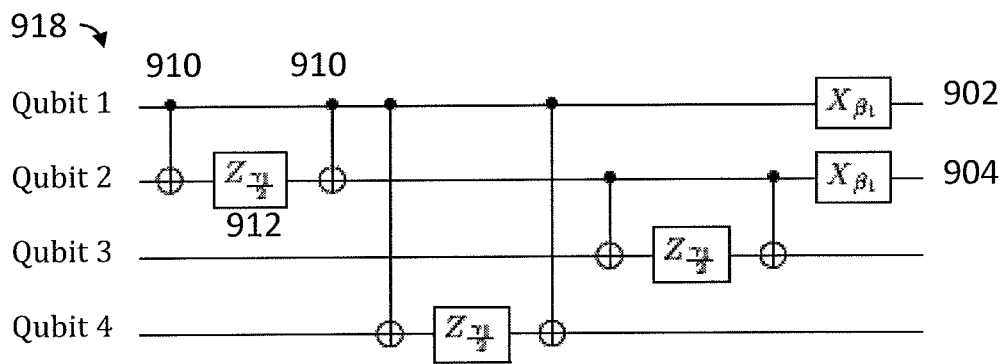
FIGS. 9B and 9C illustrate reduced trial state preparation circuits according to one embodiment.
Figure 9C:
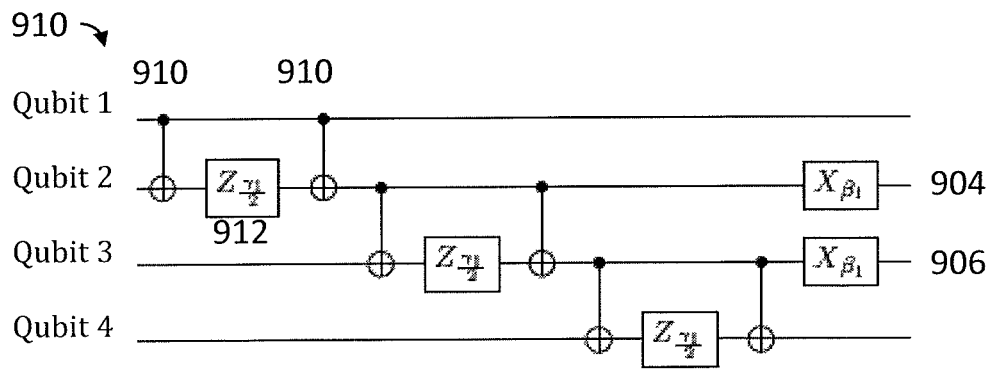

For example, the model Hamiltonian $H_C = \sigma_1^Z \otimes \sigma_2^Z + \sigma_2^Z \otimes \sigma_3^Z + \sigma_3^Z \otimes \sigma_4^Z + \sigma_1^Z \otimes \sigma_4^Z$ defined on a system of four qubits (qubit 1, 2, ..., 4) may be grouped into four sub-Hamiltonians, $H_1 = \sigma_1^Z \otimes \sigma_2^Z$, $H_2 = \sigma_2^Z \otimes \sigma_3^Z$, $H_3 = \sigma_3^Z \otimes \sigma_4^Z$, and $H_4 = \sigma_1^Z \otimes \sigma_4^Z$. FIG. 9A illustrates the trial state preparation circuit (A($\vec{\gamma}, \vec{\beta}$) = $U(\gamma_1) U_{Mix}(\beta_1)$) 900, where p=1. The mixing circuit $U_{Mix}(\beta_l)$ can be implemented by single-qubit rotation gates 902, 904, 906, 908 on qubits 1, 2, 3, and 4, respectively. The entangling circuit $U(\gamma_1)$ is related to the model Hamiltonian $H_C$ as described above. The first term $\sigma_1^Z \otimes \sigma_2^Z$ in the model Hamiltonian $H_C$ can be implemented in combination of controlled-NOT gates 910 on qubit 2 conditioned on qubit 1 and targeted on qubit 2, and a single-qubit rotation gate 912 on qubit 2 about the Z-axis of the Bloch sphere 400 by a polar angle $\gamma_1/2$. As one will appreciate, the implementation of such gates can be performed by combining properly adjusted XX-gate operation between qubits 1 and 2 and composite pulses applied to qubits 1 and 2. Other terms in the model Hamiltonian $H_C$ can be implemented similarly. FIG. 9B illustrates the reduced state preparation circuits ($A_{PCC}^1(\vec{\gamma}, \vec{\beta})$) 914 to evaluate an expectation value of the sub-Hamiltonian $H_1 = \sigma_1^Z \otimes \sigma_2^Z$. Since qubits 3 and 4 do not affect the expectation value of the sub-Hamiltonian $H_1 = \sigma_1^Z \otimes \sigma_2^Z$, the set of gates 916 and the single-qubit rotation gates 906, 908 (illustrated in FIG. 9A) that are applied only to qubits 3 and 4 in the trial state preparation circuit A($\vec{\gamma}, \vec{\beta}$) are removed. FIG. 9C illustrates the reduced state preparation circuits ($A_{PCC}^2(\vec{\gamma}, \vec{\beta})$) 918 to evaluate an expectation value of the sub-Hamiltonian $H_2 = \sigma_2^Z \otimes \sigma_3^Z$. Since qubits 1 and 4 do not affect the expectation value of the sub-Hamiltonian $H_2 = \sigma_2^Z \otimes \sigma_3^Z$, the set of gates 920 and the single-qubit rotation gates 902, 908

(illustrated in FIG. 9A) that are applied only to qubits 1 and 4 in the trial state preparation circuit $A(\vec{\gamma}, \vec{\beta})$ are removed. The reduced state preparation circuits $A_{PCC}{}^{\lambda}(\vec{\gamma}, \vec{\beta})$ to evaluate an expectation value of other sub-Hamiltonians $H_\lambda$ can be constructed similarly.

With the reduced trial state preparation circuit $A_{PCC}{}^{\lambda}(\vec{\theta})$, $A_{PCC}{}^{\lambda}(\vec{\gamma}, \vec{\beta})$ for a sub-Hamiltonian $H_\lambda$, a trial state $|\Psi_\lambda(\vec{\theta})\rangle$, $|\Psi_\lambda(\vec{\gamma}, \vec{\beta})\rangle$ is prepared on the quantum processor 106 to evaluate an expectation of the sub-Hamiltonian $H_\lambda$. This step is repeated for all of the sub-Hamiltonians $H_\lambda$ ($\lambda=1, 2, \ldots, u$). The expectation value of the model Hamiltonian $H_C$ is a sum of the expectation values of all of the sub-Hamiltonians $H_\lambda$ ($\lambda=1, 2, \ldots, u$). The use of the reduced trial state preparation circuit $A_{PCC}{}^{\lambda}(\vec{\theta})$, $A_{PCC}{}^{\lambda}(\vec{\gamma}, \vec{\beta})$ reduces the number of gate operations to apply on the quantum processor 106. Thus, a trial state $|\Psi_\lambda(\vec{\theta})\rangle$, $|\Psi_\lambda(\vec{\gamma}, \vec{\beta})\rangle$ can be constructed without accumulating errors due to the noise in the NISQ device.

In block 806, following the selection of a set of variational parameters $\vec{\theta}$, $(\vec{\gamma}, \vec{\beta})$, the quantum processor 106 is set in an initial state $|\Psi_0\rangle$ by the system controller 104. In the VQE algorithm, the initial state $|\Psi_0\rangle$ may correspond to an approximate ground state of the system that is calculated by a classical computer or an approximate ground state that is empirically known to one in the art. In the QAOA algorithm, the initial state $|\Psi_0\rangle$ may be in the hyperfine ground state of the quantum processor 106 (in which all qubits are in the uniform superposition over computational basis states (in which all qubits are in the superposition of $|0\rangle$ and $|1\rangle$, $|0\rangle+|1\rangle$). A qubit can be set in the hyperfine ground state $|0\rangle$ by optical pumping and in the superposition state $|0\rangle+|1\rangle$ by application of a proper combination of single-qubit operations (denoted by "H" in FIG. 7) to the hyperfine ground state $|0\rangle$.

In block 808, following the preparation of the quantum processor 106 in the initial state $|\Psi_0\rangle$, the trial state preparation circuit $A(\vec{\theta})$, $A(\vec{\gamma}, \vec{\beta})$ is applied to the quantum processor 106, by the system controller 104, to construct the trial state $|\Psi_\lambda(\vec{\theta})\rangle$, $|\Psi_\lambda(\vec{\gamma}, \vec{\beta})\rangle$ for evaluating an expectation of the sub-Hamiltonian $H_\lambda$. The reduced trial state preparation circuit $A_{PCC}{}^{\lambda}(\vec{\theta})$, $A_{PCC}{}^{\lambda}(\vec{\gamma}, \vec{\beta})$ is decomposed into series of XX-gate operations (XX gates) and single-qubit operations (R gates) and optimized by the classical computer 102. The series of XX-gate operations (XX gates) and single-qubit operations (R gates) can be implemented by application of a series of laser pulses, intensities, durations, and detuning of which are appropriately adjusted by the classical computer 102 on the set initial state $|\Psi_0\rangle$ and transform the quantum processor from the initial state $|\Psi_0\rangle$ to trial state $|\Psi_\lambda(\vec{\theta})\rangle$, $|\Psi_\lambda(\vec{\gamma}, \vec{\beta})\rangle$.

In block 810, following the construction of the trial state $|\Psi_\lambda(\vec{\theta})\rangle$, $|\Psi_\lambda(\vec{\gamma}, \vec{\beta})\rangle$ on the quantum processor 106, the expectation value $F_\lambda(\vec{\theta})=\langle\Psi_\lambda(\vec{\theta})|H_\lambda|\Psi_\lambda(\vec{\theta})\rangle F_\lambda(\vec{\gamma}, \vec{\beta})=\langle\Psi_\lambda(\vec{\gamma}, \vec{\beta})|H_\lambda|\Psi_\lambda(\vec{\gamma}, \vec{\beta})\rangle$ of the sub-Hamiltonian $H_\lambda$)$\lambda=1, 2, \ldots, u$) is measured by the system controller 104. Repeated measurements of populations of the trapped ions in the group 106 of trapped ions the trial state $|\Psi_\lambda(\vec{\theta})\rangle$, $|\Psi_\lambda(\vec{\gamma}, \vec{\beta})\rangle$ (by collecting fluorescence from each trapped ion and mapping onto the PMT 110) yield the expectation value the sub-Hamiltonian $H_\lambda$.

In block 812, following the measurement of the expectation value of the sub-Hamiltonian $H_\lambda$ ($\lambda=1, 2, \ldots, u$), blocks 806 to 810 for another sub-Hamiltonian $H_\lambda$ ($\lambda=1, 2, \ldots, u$) until the expectation values of all the sub-Hamiltonian $H_\lambda$ ($\lambda=1, 2, \ldots, u$) in the model Hamiltonian $H_C=\Sigma_{\lambda=1}{}^{u}H_\lambda$ have been measured by the system controller 104.

In block 814, following the measurement of the expectation values of all the sub-Hamiltonian $H_\lambda$ ($\lambda=1, 2, \ldots, u$), a sum of the measured expectation values of all the sub-Hamiltonian $H_\lambda$ ($\lambda=1, 2, \ldots, u$) of the model Hamiltonian $H_C=\Sigma_{\lambda=1}{}^{u}H_\lambda$ (that is, the measured expectation value of the model Hamiltonian $H_C$, $F(\vec{\theta})=\Sigma_{\lambda=1}{}^{u}F_\lambda(\vec{\theta})$, $F(\vec{\gamma}, \vec{\beta})=\Sigma_{\lambda=1}{}^{u}F_\lambda(\vec{\gamma}, \vec{\beta})$ is computed, by the classical computer 102.

In block 816, following the computation of the measured expectation value of the model Hamiltonian $H_C$, the measured expectation value $F(\vec{\gamma}, \vec{\beta})$ of the model Hamiltonian $H_C$ is compared to the measured expectation value of the model Hamiltonian $H_C$ in the previous iteration, by the classical computer 102. If a difference between the two values is less than a predetermined value (i.e., the expectation value sufficiently converges towards a fixed value), the method proceeds to block 820. If the difference between the two values is more than the predetermined value, the method proceeds to block 818.

In block 818, another set of variational parameters $\vec{\theta}$, $(\vec{\gamma}, \vec{\beta})$ for a next iteration of blocks 806 to 816 is computed by the classical computer 102, in search for an optimal set of variational parameters $\vec{\theta}$, $(\vec{\gamma}, \vec{\beta})$ to minimize the expectation value of the model Hamiltonian $H_C$, $F(\vec{\theta})=\Sigma_{\lambda=1}{}^{u}F_\lambda(\vec{\theta})$, $F(\vec{\gamma}, \vec{\beta})=\Sigma_{\lambda=1}{}^{u}F_\lambda(\vec{\gamma}, \vec{\beta})$. That is, the classical computer 102 will execute a classical optimization method to find the optimal set of variational parameters $\vec{\theta}$, $(\vec{\gamma}, \vec{\beta})$ $$\left(\min_{\vec{\theta}} F(\vec{\theta}), \min_{\vec{\gamma}, \vec{\beta}} F(\vec{\gamma}, \vec{\beta})\right).$$

Example of conventional classical optimization methods include simultaneous perturbation stochastic approximation (SPSA), particle swarm optimization (PSO), Bayesian optimization (BO), and Nelder-Mead (NM).

In block 820, the classical computer 102 will typically output the results of the variational search to a user interface of the classical computer 102 and/or save the results of the variational search in the memory of the classical computer 102. The results of the variational search will include the measured expectation value of the model Hamiltonian $H_C$ in the final iteration corresponding to the minimized energy of the system in the selected quantum chemistry problem, or the minimized value of the objective function $C(z)=\Sigma_{\alpha=1}{}^{n}h_\alpha C_\alpha(z)$ of the selected combinatorial optimization problem (e.g., a shortest distance for all of the trips visiting all given cities in a travelling salesman problem) and the measurement of the trail state $|\Psi_\lambda(\vec{\theta})\rangle$, $|\Psi_\lambda(\vec{\gamma}, \vec{\beta})\rangle$ in the final iteration corresponding to the configuration of electrons or spins that provides the lowest energy of the system, or the solution to the N-bit string ($z=z_1 z_2 \ldots z_N$) that provides the minimized value of the objective function $C(z)=\Sigma_{\alpha=1}^r h_\alpha C_\alpha(z)$ of the selected combinatorial optimization problem (e.g., a route of the trips to visit all of the given cities that provides the shortest distance for a travelling salesman).

The variational search reduced trial state preparation circuits described herein provides an improved method for obtaining a solution to an optimization problem by the Variational Quantum Eigensolver (VQE) algorithm or the Quantum Approximate Optimization Algorithm (QAOA) on a hybrid quantum-classical computing system. Thus, the feasibility that a hybrid quantum-classical computing system may allow solving problems, which are not practically feasible on classical computers, or suggest a considerable speed up with respect to the best known classical algorithm even with a noisy intermediate-scale quantum device (NISQ) device.

While the foregoing is directed to specific embodiments, other and further embodiments may be devised without departing from the basic scope thereof, and the scope thereof is determined by the claims that follow.

The invention claimed is:

1. A method of performing computation in a hybrid quantum-classical computing system comprising a classical computer and a quantum processor, comprising:
   computing, by a classical computer, a model Hamiltonian onto which a selected problem is mapped, wherein the model Hamiltonian comprises a plurality of sub-Hamiltonians;
   setting a quantum processor in an initial state, wherein the quantum processor comprises a plurality of trapped ions, each of which has two frequency-separated states defining a qubit;
   transforming the quantum processor from the initial state to a trial state based on each of the plurality of sub-Hamiltonians and an initial set of variational parameters by applying a reduced trial state preparation circuit to the quantum processor;
   measuring an expectation value of each of the plurality of sub-Hamiltonians on the quantum processor; and
   determining, by the classical computer, if a difference between the measured expectation value of the model Hamiltonian is more or less than a predetermined value, wherein the classical computer either:
   selects another set of variational parameters based on a classical optimization method if it is determined that the difference is more than the predetermined value and then:
     sets the quantum processor in the initial state,
     transforms the quantum processor from the initial state to a new trial state based on each of the plurality of sub-Hamiltonians and the another set of variational parameters by applying a new reduced trial state preparation circuit to the quantum processor, and
     measures an expectation value of the each of the plurality of sub-Hamiltonians on the quantum processor after transforming the quantum processor to the new trial state; or
   outputs the measured expectation value of the model Hamiltonian as an optimized solution to the selected problem if it is determined that the difference is less than the predetermined value.

2. The method according to claim 1, wherein the reduced trial state preparation circuit does not include gate operations that do not influence the expectation value of the each of the plurality of sub-Hamiltonians.

3. The method according to claim 1, wherein if it is determined that the difference is more than the predetermined value, the determining step is repeated.

4. The method according to claim 1, wherein the problem to be solved is finding a lowest energy of a many-particle quantum system.

5. The method according to claim 4, further comprising:
   selecting, by the classical computer, the initial set of variational parameters,
   wherein the initial set of variational parameters is selected randomly.

6. The method according to claim 4, wherein setting the quantum processor in the initial state comprising setting the plurality of trapped ions in the quantum processor in an approximate state of the many-particle quantum system that is calculated by the classical computer.

7. The method according to claim 1, wherein the problem to be solved is a combinatorial optimization problem.

8. The method according to claim 7, further comprising:
   selecting, by the classical computer, the initial set of variational parameters,
   wherein the initial set of variational parameters is selected by the classical computer randomly.

9. The method according to claim 7, wherein setting the quantum processor in the initial state comprising setting, by a system controller, each trapped ion in the quantum processor in a superposition of the two frequency-separated states.

10. A hybrid quantum-classical computing system, comprising:
    a quantum processor comprising a group of trapped ions, each of the trapped ions having two hyperfine states defining a qubit;
    one or more lasers configured to emit a laser beam, which is provided to trapped ions in the quantum processor; and
    a classical computer configured to:
      select a problem to be solved;
      compute a model Hamiltonian onto which the selected problem is mapped, wherein the model Hamiltonian comprises a plurality of sub-Hamiltonians;
      select a set of variational parameters;
      set the quantum processor in an initial state;
      transform the quantum processor from the initial state to a trial state based on each of the plurality of sub-Hamiltonians and an initial set of variational parameters by applying a reduced trial state preparation circuit to the quantum processor;
      measure an expectation value of each of the plurality of sub-Hamiltonians on the quantum processor; and
      determine if a difference between the measured expectation value of the model Hamiltonian is more or less than a predetermined value,
    wherein the classical computer either:
      selects another set of variational parameters based on a classical optimization method if it is determined that the difference is more than the predetermined value and then:
        sets the quantum processor in the initial state,
        transforms the quantum processor from the initial state to a new trial state based on each of the plurality of sub-Hamiltonians and the another set of variational parameters by applying a new reduced trial state preparation circuit to the quantum processor, and measures an expectation value of each of the plurality of sub-Hamiltonians on the quantum processor after transforming the quantum processor to the new trial state; or outputs the measured expectation value of the model Hamiltonian as an optimized solution to the selected problem if it is determined that the difference is less than the predetermined value.

11. The hybrid quantum-classical computing system according to claim 10, wherein the reduced trial state preparation circuit does not include gate operations that do not influence the expectation value of the each of the plurality of sub-Hamiltonians.

12. The hybrid quantum-classical computing system according to claim 10, wherein if it is determined that the difference is more than the predetermined value, the classical computer repeats the determining step.

13. The hybrid quantum-classical computing system according to claim 10, wherein the problem to be solved is finding a lowest energy of a many-particle quantum system.

14. The hybrid quantum-classical computing system according to claim 13, wherein the classical computer further selects the initial set of variational parameters randomly.

15. The hybrid quantum-classical computing system according to claim 13, wherein the initial state is an approximate state of the many-particle quantum system that is calculated by the classical computer.

16. The hybrid quantum-classical computing system according to claim 10, wherein the problem to be solved is a combinatorial optimization problem.

17. The hybrid quantum-classical computing system according to claim 16, wherein the classical computer selects the initial set of variational parameters randomly.

18. The hybrid quantum-classical computing system according to claim 16, wherein the initial state is a superposition of the two hyperfine states.

19. A hybrid quantum-classical computing system comprising non-volatile memory having a number of instructions stored therein which, when executed by one or more processors, causes the hybrid quantum-classical computing system to perform operations comprising:

computing a model Hamiltonian onto which a selected problem is mapped, wherein the model Hamiltonian comprises a plurality of sub-Hamiltonians;

setting a quantum processor in an initial state, wherein the quantum processor comprises a plurality of trapped ions, each of which has two frequency-separated states defining a qubit;

transforming the quantum processor from the initial state to a trial state based on each of the plurality of sub-Hamiltonians and an initial set of variational parameters by applying a reduced trial state preparation circuit to the quantum processor;

measuring an expectation value of each of the plurality of sub-Hamiltonians on the quantum processor; and determining if a difference between the measured expectation value of the model Hamiltonian is more or less than a predetermined value, wherein the instructions further cause the hybrid quantum-classical computing system to either:

select another set of variational parameters based on a classical optimization method if it is determined that the difference is more than the predetermined value and then:

set the quantum processor in the initial state, transform the quantum processor from the initial state to a new trial state based on each of the plurality of sub-Hamiltonians and the another set of variational parameters by applying a new reduced trial state preparation circuit to the quantum processor, and measure an expectation value of the each of the plurality of sub-Hamiltonians on the quantum processor after transforming the quantum processor to the new trial state; or output the measured expectation value of the model Hamiltonian as an optimized solution to the selected problem if it is determined that the difference is less than the predetermined value.

20. The hybrid quantum-classical computing system according to claim 19, wherein the reduced trial state preparation circuit does not include gate operations that do not influence the expectation value of the each of the plurality of sub-Hamiltonians.

* * * * *